United States Patent
Anderson et al.

(10) Patent No.: US 6,624,872 B2
(45) Date of Patent: Sep. 23, 2003

(54) OPTICAL RADIATION FILTER

(75) Inventors: Duncan James Anderson, Abingdon (GB); Claire Blay, Bath (GB); Robert George Watling Brown, Thame (GB); Gillian Margaret Davis, Huntingdon (GB); Nathan Smith, Plympton (GB); Kathryn Walsh, Mansfield (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/969,276

(22) Filed: Oct. 2, 2001

(65) Prior Publication Data

US 2002/0024625 A1 Feb. 28, 2002

Related U.S. Application Data

(62) Division of application No. 09/014,957, filed on Jan. 28, 1998, now Pat. No. 6,339,464.

(30) Foreign Application Priority Data

Jan. 31, 1997 (GB) ............................................. 9702077

(51) Int. Cl.⁷ ................................................ G02F 1/13
(52) U.S. Cl. ........................................ 349/194; 349/98
(58) Field of Search ............................. 349/97, 98, 165, 349/117, 194, 176

(56) References Cited

U.S. PATENT DOCUMENTS

| | | | |
|---|---|---|---|
| 4,637,896 A | | 1/1987 | Shannon |
| 4,725,460 A | | 2/1988 | Matsuo et al. |
| 4,726,663 A | | 2/1988 | Buzak |
| 4,983,479 A | | 1/1991 | Broer et al. |
| 5,301,045 A | * | 4/1994 | Miller et al. ............... 349/115 |
| 5,548,422 A | | 8/1996 | Conner et al. |
| 5,991,001 A | | 11/1999 | Park |
| 6,061,108 A | | 5/2000 | Anderson et al. |
| 6,072,629 A | * | 6/2000 | Fan et al. .................... 359/497 |
| 6,133,980 A | | 10/2000 | Faris |
| 6,181,395 B1 | | 1/2001 | Li et al. |
| 6,188,460 B1 | * | 2/2001 | Faris .......................... 349/176 |

FOREIGN PATENT DOCUMENTS

| | | |
|---|---|---|
| EP | 0 154 953 | 9/1985 |
| EP | 0 397 263 | 11/1990 |
| EP | 0 606 940 | 7/1994 |
| EP | 0 720 041 | 7/1996 |
| GB | 2 132 623 | 7/1984 |
| GB | 2 166 755 | 5/1986 |
| JP | 6 132 801 | 2/1986 |
| WO | 97/23 580 | 7/1997 |

OTHER PUBLICATIONS

Search Report for Application No. GB 9702077.0; Dated Oct. 27, 1997.

(List continued on next page.)

*Primary Examiner*—Kenneth Parker
(74) *Attorney, Agent, or Firm*—Renner, Otto, Boisselle & Sklar

(57) ABSTRACT

A cholesteric film is formed into an optical device comprising a plurality of layers. The cholesteric film is initially placed in a first predetermined state, for instance heating to a first predetermined temperature, and is then irradiated with narrow band UV radiation. The properties of an upper layer of the film are fixed, for instance for reflecting normally incident infrared radiation of a particular handedness. This process is repeated for different wavelengths of UV fixing radiation so as to penetrate to different depths from the surface of the film in order to form the layers. This method may be used to produce a filter of reduced sensitivity to angle of incidence. In addition to the infrared reflecting layer, red and green reflecting layers are provided. For normally incident radiation, the red and green layers reflect red and green parts R and G, whereas the blue part B of the spectrum is transmitted. For off-axis illumination or viewing, the red part R is reflected by the infrared layer and the green part G is reflected by the red layer. The birefringence of the infrared layer and the red layer reverses the direction of circular polarisation of the blue part B, which thus passes through the green layer.

12 Claims, 22 Drawing Sheets

OTHER PUBLICATIONS

Search Report for Application No. GB 9702077.0; Dated Apr. 18, 1997.

A. Aviram et al., IBM Technical Disclosure Bulletin, vol. 15, No. 8 Jan. 1973, "Multicolor Display".

R. Maurer et al., SID 90 Digest pp. 110–113, 1990, "Polarizing Color Filters Made From Cholesteric LC Siliicones".

D.J. Broer, et al. SID 95 Digest pp. 165–168, 1995, "Invited Paper; Molecular Architectures in Thin Plastic Films By In–Situ Photopolymerization of Reactive Liquid Crystals".

G.M. Davis, Sharp Technical Journal, vol. 63, pp. 22–25, 1995, "Liquid Crystal Polymer Thin Film Anisotropic Optical Components".

V.A. Belyakov et al. Sov. Phys. USP, vol. 22 No. 2, pp. 63–68, 1979, "Optics of Cholesteric Liquid Crystals".

G. Joly et al. J. Optics vol. 25, No. 5 pp. 177–186, 1994, "Optical Properties of the Interface Between a Twisted Liquid Crystal and an Isotropic Transparent Medium".

L.E. Hajdo et al., J. Opt. Soc. Am., vol. 69, No. 7, pp. 1017–1023, 1979, "Theory of Light Reflection by Cholesteric Liquid Crystals Possessing a Pitch Gradient".

European Search Report for Application No. 98300690.9–2205; Dated Sep. 3, 1998.

Mauer et al. SID 94 Digest pp. 399–402 (1994) "Cholesteric Reflectors With a Color Pattern".

* cited by examiner

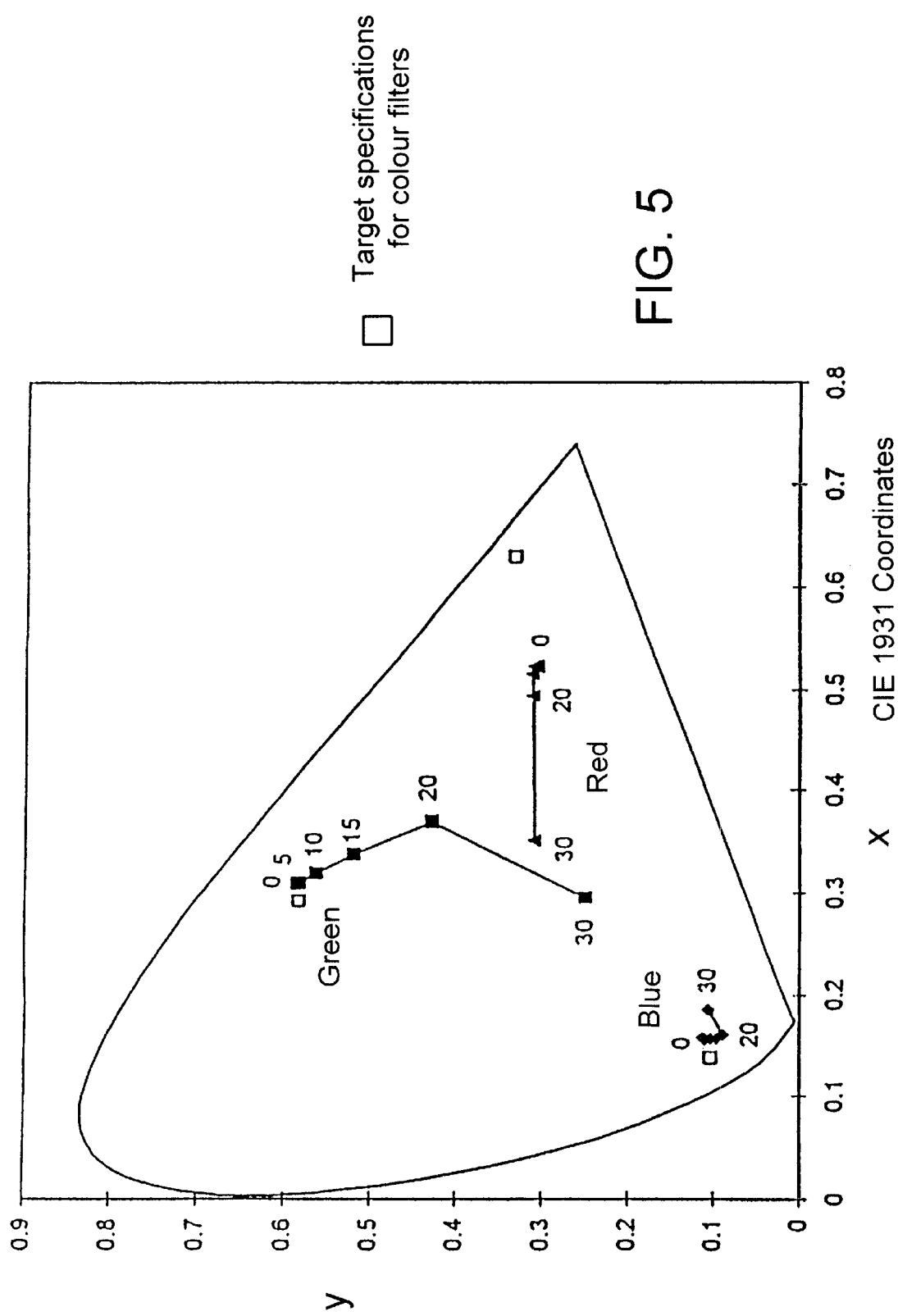

OPTICAL RADIATION FILTER

This is a division of application Ser. No. 09/014,957, filed Jan. 28, 1998, now U.S. Pat. No. 6,339,464.

The present invention relates to a method of making an optical device. The present invention also relates to a filter which, for instance, may be used as a spectral filter. Such optical devices and filters may be used in liquid crystals, displays, interference filters, color filters, holography, optical and electronic measurement and sensing systems, and are suitable for high flux applications.

R. Maurer et al, "Polarising Color Filters made from Cholesteric LC Silicones", SID digest, pp 110–112, 1990 discloses the use of cholesteric liquid crystal polymers for color filters. Such filters reflect a limited bandwidth of light of one circular polarisation and transmit other light. Stacking of cholesteric color filters makes it possible to obtain elements which transmit only a narrow band of wavelength in the visible spectrum. This technique may be used to create transmissive primary color filters for red, green and blue suitable for use in displays. Cholesteric films may be patterned lithographically by exposing regions of the films to ultraviolet (UV) irradiation at different temperatures, for instance as disclosed in U.S. Pat. No. 4, 637,896.

EP 606,940 discloses a technique for making circular polarisers by increasing the reflection bandwidth of cholesteric films from about 50 nanometres to about 300 nanometres. In particular, a combination of diffusion and a UV intensity profile is used to increase the polariser bandwidth. EP 720,041 discloses a backlight for a liquid crystal device (LCD) using patterned cholesteric transmissive color filters. Light reflected by the filters is recirculated and returned to the display so as to improve the efficiency of illumination. It is desirable that such color filters work correctly for a large range of angles of incidence, for instance so as to improve the viewing angle of a display. D. J. Broer, "Molecular Architectures in Thin Plastic Films by In-Situ Photopolymerisation of Reactive Liquid Crystals", SID 95 digest, pp 165–168, 1995, G. M. Davis "Liquid Crystal Polymer Thin Film Anisotropic Optical Components", Sharp Technical Journal, pp 22–25, vol. 63, December 1995 and U.S. Pat. No. 4,983,479 disclose techniques for providing three dimensional control of molecular order in polymer films, for instance using photoinitiated polymerisation or cross-linking of liquid crystal molecules.

It is well known that the wavelength reflected by a single pitch cholesteric film varies with angle of incidence according to:

$$\lambda(\alpha) = \lambda_0 \cos[\sin^{-1}(2\sin\alpha/n)]$$

where $\lambda_0$ is the central wavelength for normal incidence, $\lambda(\alpha)$ is the centre wavelength for light incident at an angle $\alpha$, and $n/2$ is the average refractive index $(n_0 + n_e)/2$, where $n_0$ and $n_e$ are the ordinary and extraordinary indices of the cholesteric material respectively. It is also known that the polarisation state of the reflected and transmitted light has a complex dependence on wavelength and angle of incidence of the illuminating light, for instance as disclosed in V. A. Belyakov et al, "Optics of Cholesteric Liquid Crystals", Sov. Phys. Usp. 22(2), pp 63–88, February 1979 and G. Joly et al, "Optical Properties of the Interface between a Twisted Liquid Crystal and an Isotropic Transparent Medium", J. Optics, vol. 25, pp 177–186, 1994. Such variations and dependencies are undesirable for many applications, for instance of color filters, where behaviour substantially independent of angle of incidence is desired. For graded pitch cholesteric devices in which the cholesteric pitch varies so as to increase the width of reflection bandwidth, the angular dependence is more complex. L. E. Hajdo et al, J. Opt. Soc. Am. vol. 69, no. 7, July 1979 "Theory of Light Reflection by Cholesteric Liquid Crystals Possessing a Pitch Gradient" deals only with light incident normally on the cholesteric layer.

GB-A-2 166 755 discloses a method of selectively polymerising a cholesteric liquid crystal monomer by masking the liquid crystal and curing the un-masked areas by irradiation with ultra violet light. The whole liquid crystal is irradiated. However, 3-dimensional effects arise because the liquid crystal near the surface of the irradiated areas will not be completely polymerised, since oxygen will inhibit the polymerisation. If the irradiation is carried out in air, therefore, the regions of the liquid crystal near the surface will have different properties from the polymer in the internal regions of the liquid crystal. This document does not disclose irradiating the liquid crystal in such a way that the depth to which the liquid crystal is irradiated can be controlled.

GB-A-2 132 623 discloses the production of structures whose properties have 2-dimensional variations—they vary over the surface area of the structure. A liquid crystal layer is irradiated through a first mask under a first set of conditions. The mask is then removed and the non-polymerised areas are subsequently irradiated under different conditions. This will lead to a structure in which the properties vary over the area of the structure but are constant over the depth of the structure.

EP-A-0 154 953 provides an optical filter having two separate polymer films. The first film is polymerised under one set of conditions, and the second film is polymerised under different conditions.

EP-A-0 397 263 discloses a method of manufacturing a polariser by irradiating a liquid crystal monomer.

Multilayer cholesteric filters are disclosed in EP-A-0 720 041, U.S. Pat. No. 5,548, 422, U.S. Pat. No. 4,726,663, JP-A-61 032 801 and "IBM Technical Disclosure Bulletin" Vol 15, No 8, pp 2538–2539. These documents primarily relate to the case of normal incidence.

According to a first aspect of the invention, a filter is provided for passing optical radiation of a first circular polarisation in a first waveband incident on an input surface. The filter includes a first layer having a first cholesteric reflector for reflecting normally incident radiation of the first circular polarisation in a second waveband below the first waveband. The filter further includes a second layer which has a second cholesteric reflector for reflecting normally incident radiation transmitted by the first reflector of the first circular polarisation in a third waveband below the second waveband. In addition, the filter includes a third layer which has a third cholesteric reflector for reflecting normally incident radiation transmitted by the first and second reflectors of a second circular polarisation substantially orthogonal to the first circular polarisation in a fourth waveband at least partially between the first and second wavebands. The first and second layers have a total birefringence for non-normally incident radiation in the second waveband such that non-normally incident radiation in the second waveband is at least partially converted from the first polarisation to the second polarisation such that both normally incident and non-normally incident radiation of the first circular polarisation in the first waveband are passed.

According to a second aspect of the invention, a filter is provided for passing optical radiation of a first circular polarisation in a second waveband incident on an input surface. The filter includes a first layer which has a first cholesteric reflector for reflecting normally incident radiation of the first circular polarisation in a fifth waveband, and a second layer which includes a second cholesteric reflector for reflecting normally incident radiation transmitted by the first reflector of the first circular polarisation in a third waveband below the second waveband. The filter further includes a third layer which has a third cholesteric reflector for reflecting normally incident radiation transmitted by the first and second reflectors of the first circular polarisation in a first waveband between the fifth and second wavebands, and a fourth layer which has a fourth cholesteric reflector for reflecting normally incident radiation transmitted by the first, second and third reflectors of a second circular polarisation substantially orthogonal to the first circular polarisation in the second waveband. The first and second layers have a total birefringence for non-normally incident radiation in the second waveband such that non-normally incident radiation in the second waveband is at least partially converted from the first circular polarisation to the second circular polarisation. The first, second and third layers have a total birefringence for non-normally incident radiation in the third waveband such that non-normally incident radiation in the third waveband is at least partially converted from the first circular polarisation to the second circular polarisation such that both normally incident and non-normally incident radiation of the first circular polarisation in the second waveband are passed.

According to a third aspect of the invention, a filter is provided for passing optical radiation of a first circular polarisation in a third waveband incident on an input surface. The filter includes a first layer which has a first cholesteric reflector for reflecting normally incident radiation of the first circular polarisation in a fifth waveband above the third waveband, a second layer which has a second cholesteric reflector for reflecting normally incident radiation transmitted by the first reflector of the first circular polarisation in a first waveband between the fifth and third wavebands, and a third layer which has a third cholesteric reflector for reflecting normally incident radiation transmitted by the first and second reflectors of the first circular polarisation in a second waveband between the first and third wavebands. The first and second layers have a total birefringence for non-normally incident radiation in the third waveband such that the non-normally incident radiation in the third waveband is at least partially converted to a second circular polarisation substantially orthogonal to the first circular polarisation such that both normally incident and non-normally incident radiation of the first circular polarisation in the third waveband are passed.

The present invention thus relates to a filter and method which allows three-dimensional structures to be formed in a polymer film as a single element or device. For instance, this method may be used to form the various filters, although such filters may less-advantageously be formed by other techniques. The structure of the film may be varied with depth to achieve a desired angular response in a cholesteric spectral filter or other device. The anisotroptic nature of liquid crystal molecules, the ability to control the orientation of these molecules, for instance by surface effects or application of electric or magnetic fields, and the ability of UV light to fix the orientation enable complex three dimensional structures to be created. For instance, single film notch filters and single film RGB transmissive color filters may be formed.

The angular behaviour of devices such as filters may be controlled using these techniques. For instance, it is possible to provide spectral filters which retain their performance over a wider angular range of incidence and emergence than for known devices.

Another advantage of such cholesteric color filters is that they may be used in systems with a large optical flux, such as projector systems. In particular, because unwanted light is reflected rather than being absorbed, the filters are subjected to less thermal stress. Thus, improved color stability and operating life may be achieved.

The invention will be further described, by way of example, with reference to the accompanying drawings, in which:

FIG. 5 illustrates the angular variation of CIE color coordinates of a narrow angle color filter;

FIGS. 14a to 14d are graphs of transmission against wavelength in nanometres of a left handed green graded pitch cholesteric filter illuminated on the short pitch face with the response to left handed circularly polarised light being illustrated by the unbroken curve and to right handed circularly polarised light by the broken curve for angles of incidence of 0, 10, 20 and 30 degrees, respectively.

Figure 15:
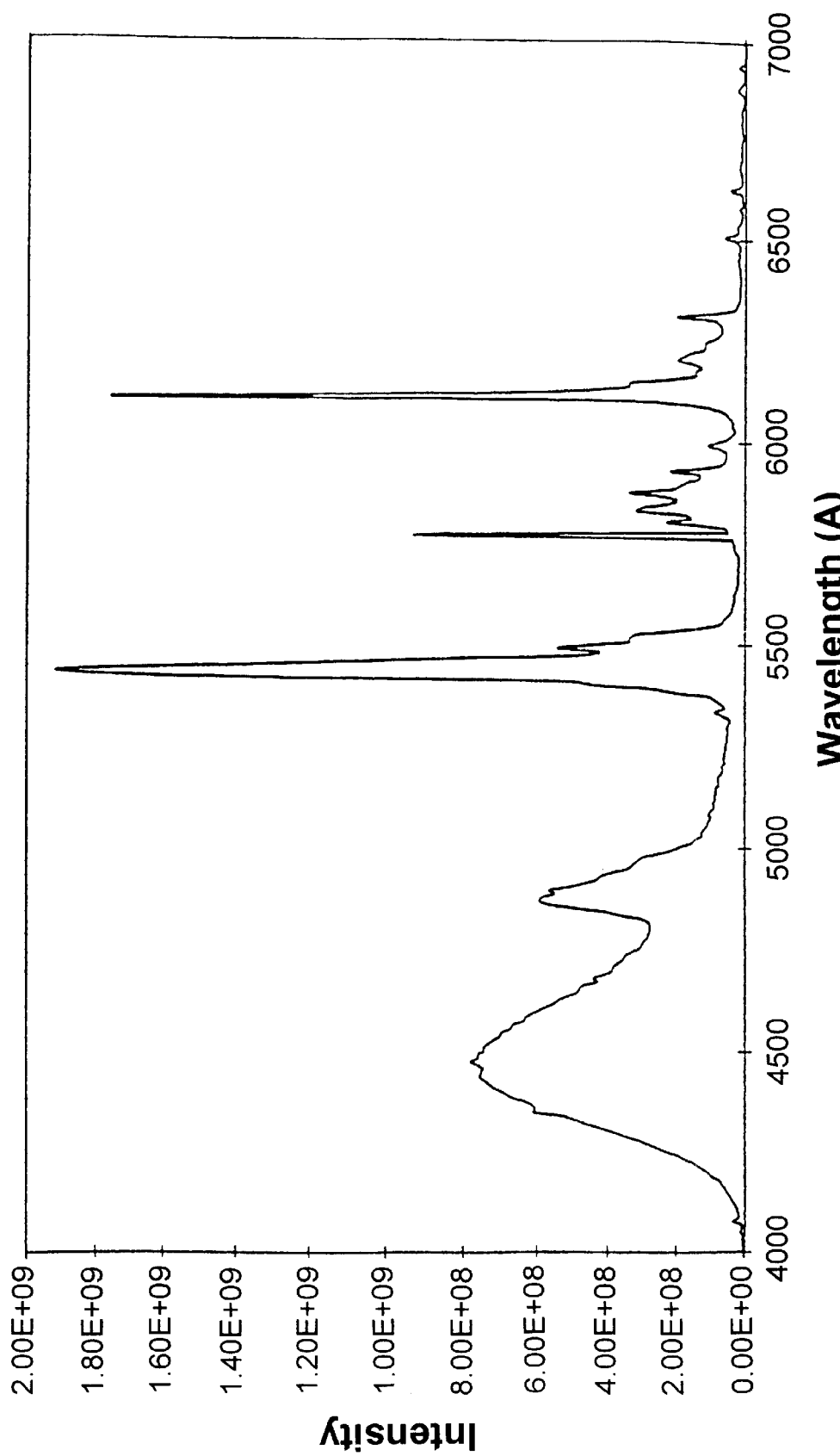
Figure 16A:
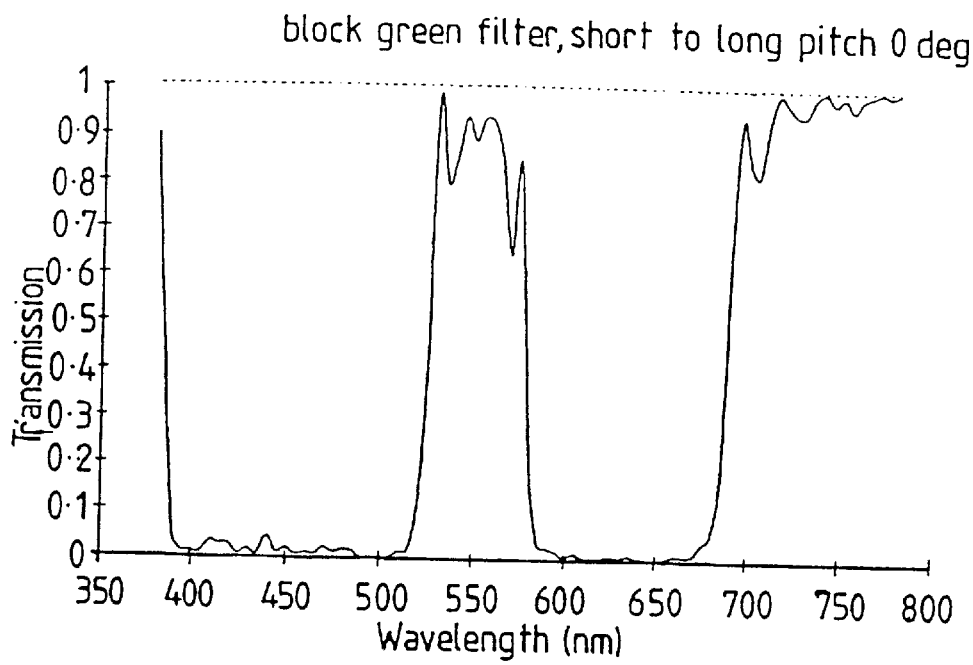
Figure 16B:
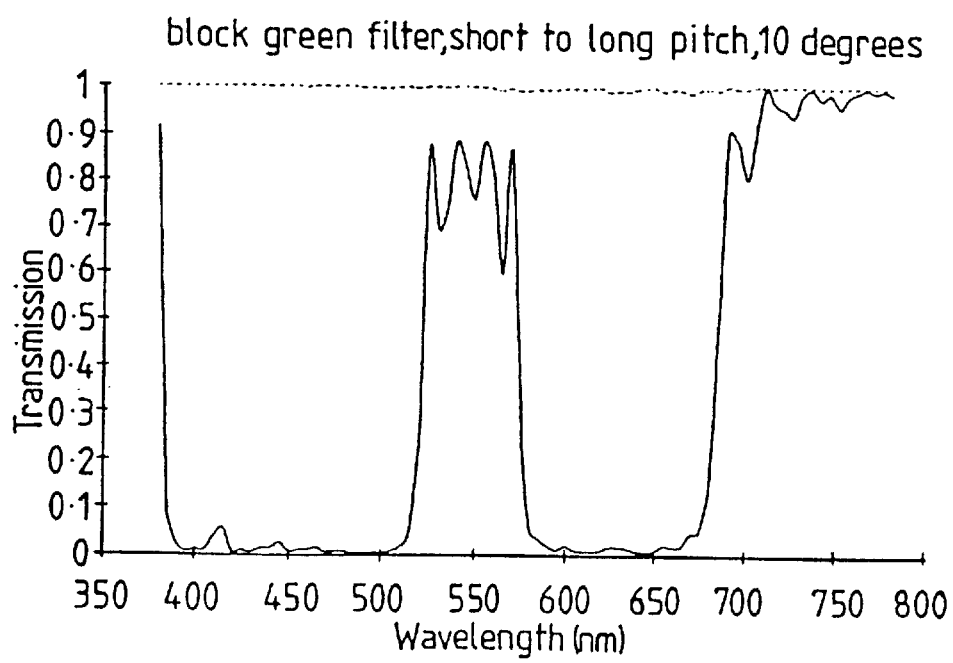
Figure 16C:
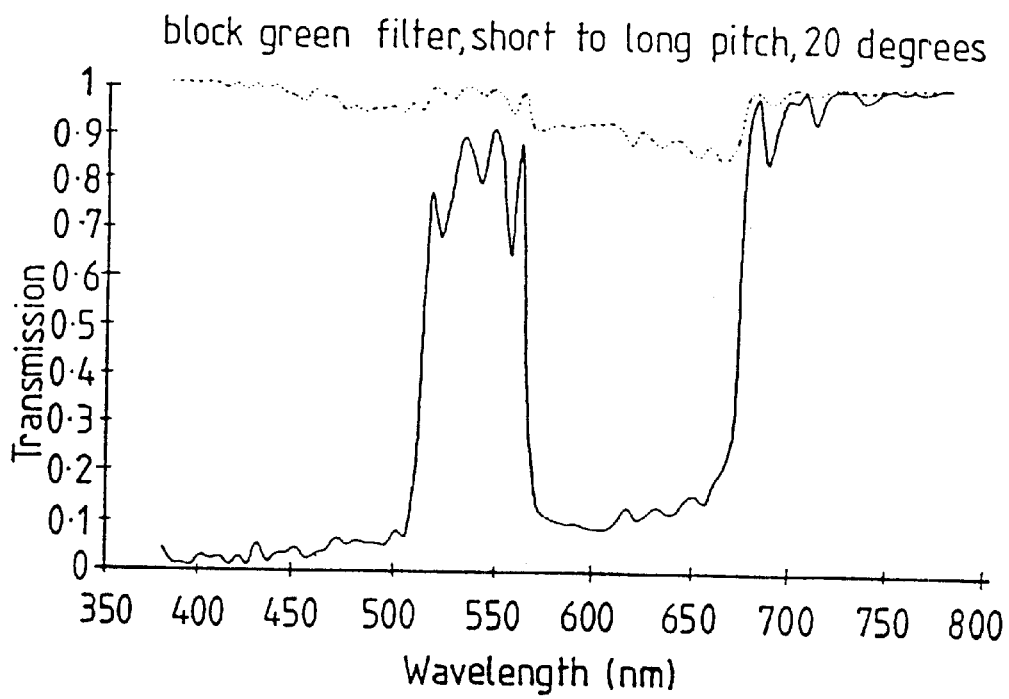
Figure 16D:
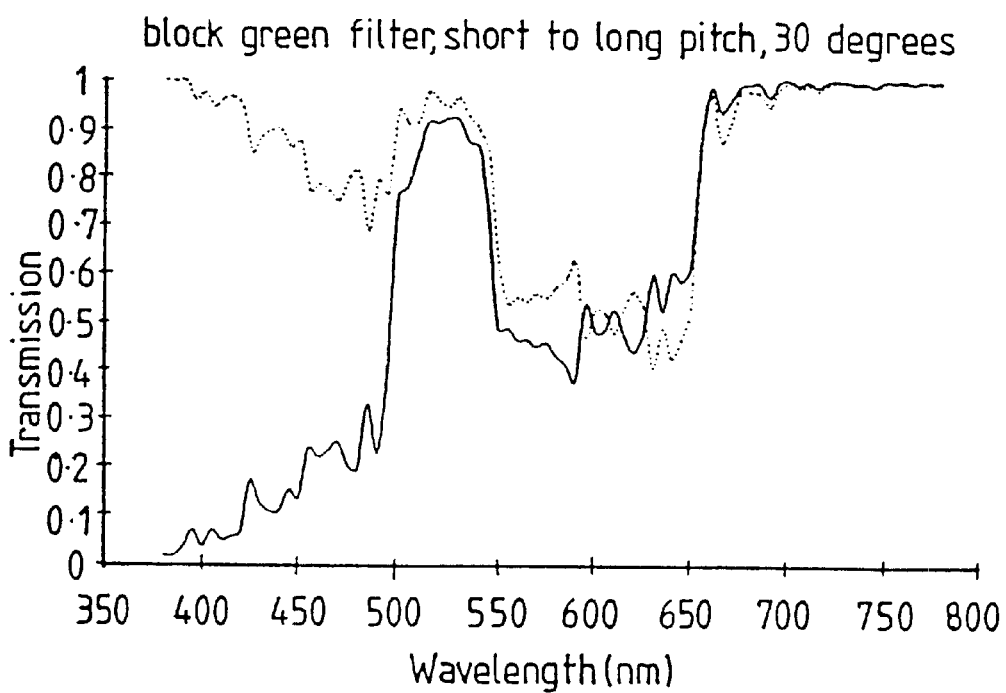

FIG. 15 is a graph of intensity against wavelength in Ångstroms illustrating the spectrum of a typical backlight for an LCD; and FIGS. 16a to 16d are graphs similar to FIGS. 14a to 14d, respectively, for a left handed green cholesteric filter comprising a plurality of discrete layers.

Like reference numerals refer to like parts throughout the drawings.

Figure 1A:
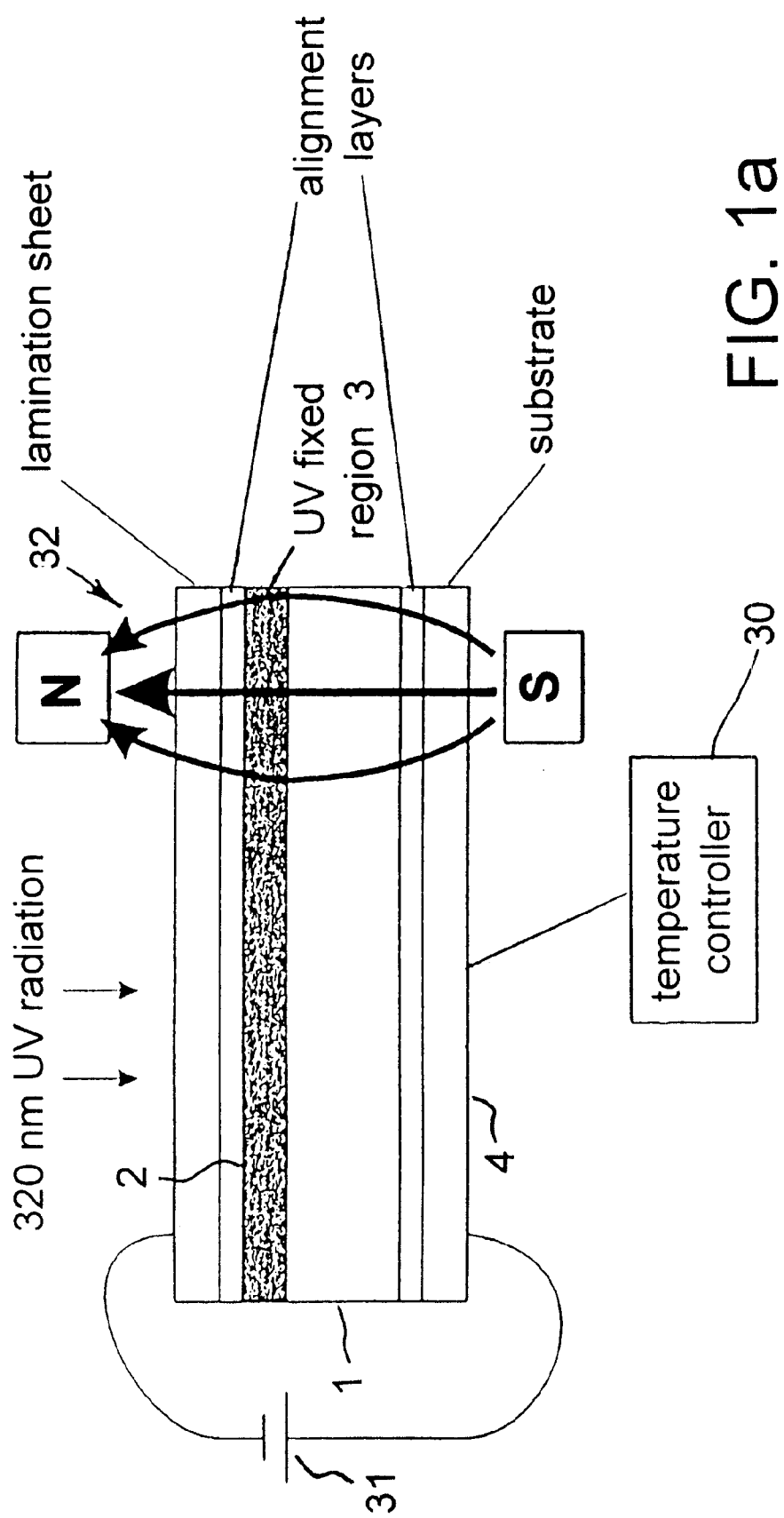
FIGS. 1a to 1c are diagrammatic cross-sectional views illustrating steps in a method constituting an embodiment of the invention.
Figure 1B:
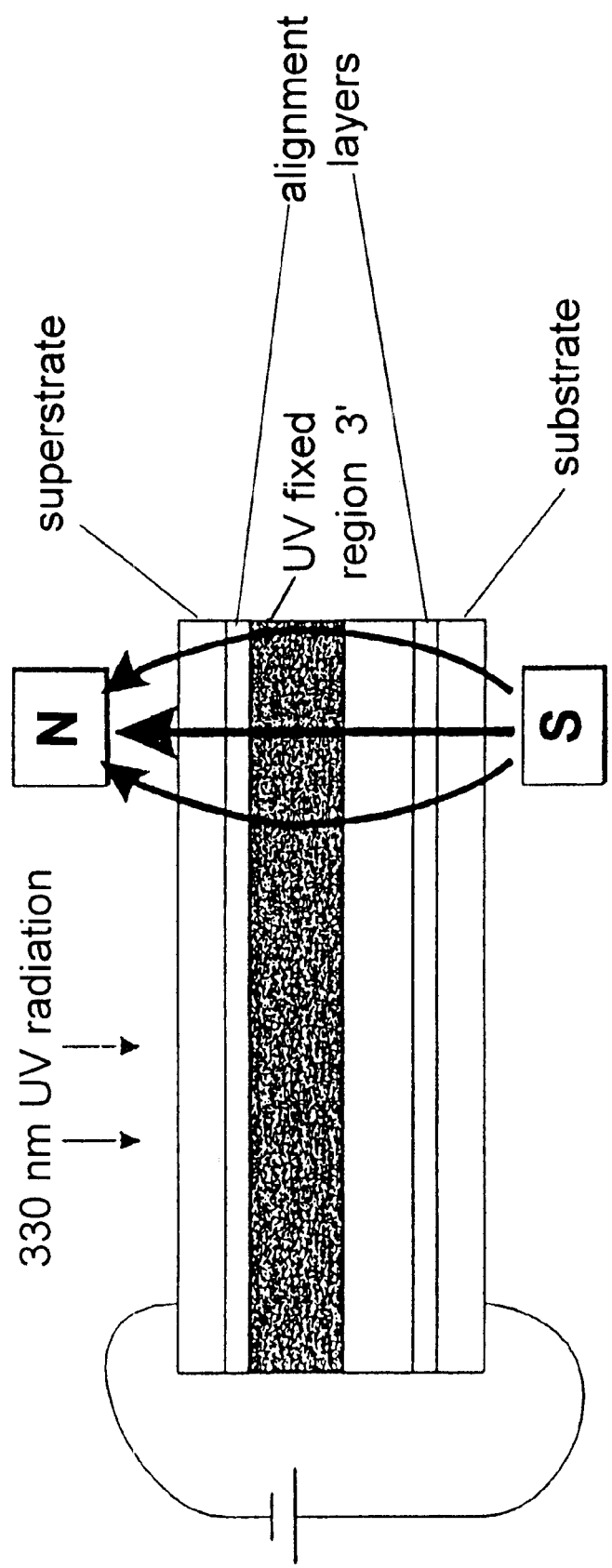
Figure 1C:
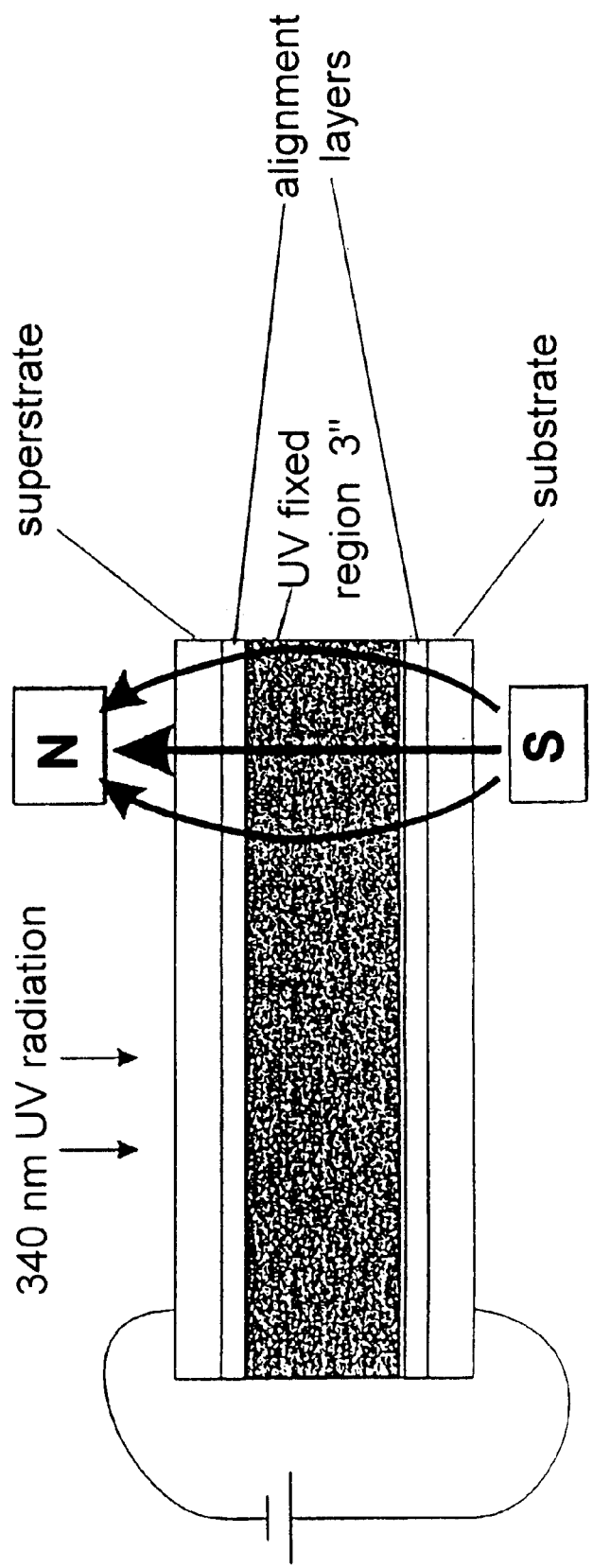

FIGS. 1a to 1c illustrate a method of making a single film optical device. The method may be used for making optical devices whose reflective, transmissive and angular properties are controlled as described hereinafter. A three dimensional vertically integrated structure is formed in a film of cholesteric material which is UV fixable. The film illustrated in FIGS. 1a to 1c is approximately 10 microns thick.

The method is performed in a number of steps and FIGS. 1a to 1c illustrate a three step method. In the first step illustrated in FIG. 1a, a first predetermined physical condition of the film 1 is established. The physical condition may be established by any suitable means, such as establishing a predetermined temperature for a predetermined time by means of a temperature controller 30, applying an electric field as shown at 31, or applying a magnetic field as shown at 32 to the film. The upper surface 2 of the film is then irradiated by UV radiation having a wavelength of 320 nanometres, which is substantially completely absorbed in a layer of depth 3 microns from the surface 2. The properties of the irradiated region 3 are then substantially fixed by the irradiation.

In the second step illustrated in FIG. 1b, new physical properties are established in the unfixed region, for instance using any of the techniques mentioned for the first step or merely continuing with the existing applied conditions for another predetermined time. The film 1 is then irradiated with UV radiation having a wavelength of 330 nanometres, which has an absorption depth substantially equal to 5 microns. The region whose properties are fixed is then extended as shown at 3'.

In the third step illustrated in FIG. 1c, a further physical state of the film 1 is established and the film is irradiated on the surface 2 with UV radiation of wavelength 340 nanometres. This wavelength of radiation is absorbed in a depth of substantially 9 microns so as to provide a fixed region 3" which is comparable to the thickness of the cholesteric liquid crystal polymer film 1.

The wavelengths and wavebands of the UV radiation used in the method steps are selected so as to control the absorption depth from the surface 2 within the film 1. In principle, any number of steps may be applied so that any number of layers of different optical properties within the film 1 may be provided. If necessary, a final step may involve irradiating the film 1 with broadband UV radiation so as to ensure that the whole of the film throughout its depth becomes fixed. Further, by appropriate masking, different regions of the film may be processed in different ways so as to provide an optical device whose properties vary in three dimensions. It is thus possible to provide a pixellated device having groups of pixels of different optical characteristics.

Figure 2:
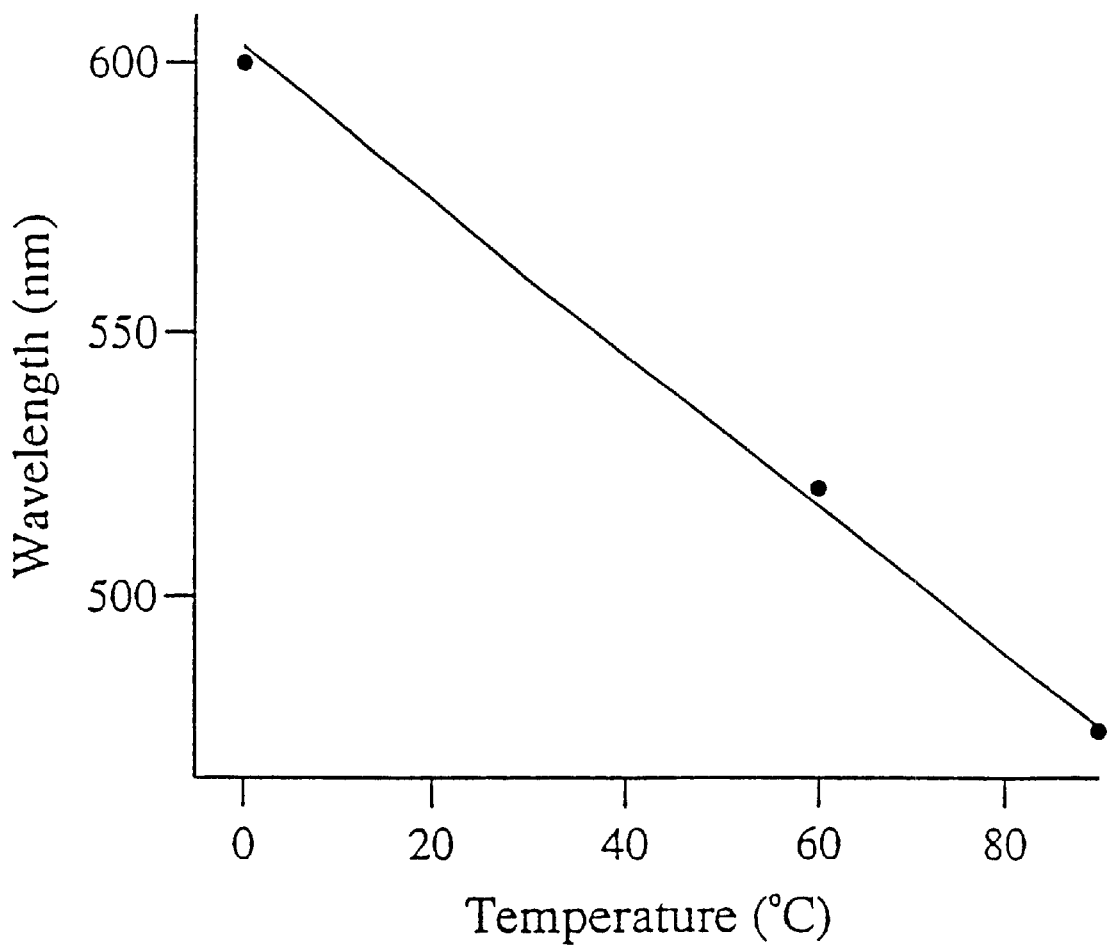
FIG. 2 is a graph of wavelength in nanometres against temperature in degrees centigrade illustrating the temperature dependence of wavelength of a single cholesteric liquid crystal polymer cell.

The physical state of the film may be varied, as mentioned hereinbefore, by changing the temperature between UV irradiations. FIG. 2 illustrates the variation in wavelength of reflection against temperature for a typical cholesteric liquid crystal polymer which is UV fixable. By changing the temperature between steps and allowing the physical state of the film to stabilise at the new temperature, differently colored reflective regions may be formed in the film and may, for instance, be combined to provide structure suitable for transmitting red, green and blue light.

Diffusion of non-fixed or weakly fixed cholesteric liquid crystal polymer, for instance furthest from the source of the UV irradiation, may partially or wholly diffuse into fixed layers or regions of the film. Such diffusion can also result in changes in the spectral reflection band and may, for instance, increase the reflection band width as disclosed in EP 606,940. Thus, where the applied physical conditions remains the same between steps, such diffusion alters the optical properties which then become fixed by UV irradiation.

An example of a cholesteric liquid crystal polymer which is suitable for use as the film 1 comprises a mixture of 57% CC 4039 L and 43% CC 4070 L both of which are available from Wacker. To this mixture is added 3% by weight of a photoinitiator, such as Irgacure 907 available from Ciba-Geigy. A free-surface film, for instance for assembly inside an LCD, is fabricated, for instance using a hot lamination method or any other standard polymer coating process. The film is formed between a substrate and a lamination sheet, both of which may be rubbed prior to film deposition and assembled with parallel alignment. For instance, alignment layers of polyamide may be coated on the substrate and/or lamination sheet. The lamination sheet may be removed at any appropriate step-during fabrication.

Following the coating procedure, the film is aligned for approximately thirty minutes by heating to between and 80 and 110 degrees centigrade. The film is then processed, for instance to form red, green and blue transmissive areas in any order with appropriate masks during each irradiation step to prevent unintended exposure of regions not currently being processed.

In order to form blue transmissive regions, the film 1 is slowly cooled to room temperature and left for a sufficient period of time for the reflection band to shift to about 625 nanometres. The upper surface 2 is then irradiated for approximately thirty seconds with narrow band UV, for instance having a band width of approximately 10 nanometres centred at 330 nanometres. This exposure fixes the top layer of the film to a depth comparable to the UV absorption depth, which is approximately one micron. The underlying cholesteric liquid crystal polymer furthest from the source of irradiation receives substantially no UV and is able to respond to increases in temperature by decreasing the helical pitch of the cholesteric material. The polymer midway between the top surface 2 and a bottom surface 4 of the film is exposed to some UV radiation and is less able to respond to changes in temperature. Consequently, raising the temperature of the cholesteric liquid crystal polymer film 1 to 80 degrees centigrade for 30 minutes broadens the bandwidth to shorter wavelengths.

In addition to bandwidth expansion caused by this thermochromic effect, diffusion of unfixed polymer into the fixed top layer causes extension of the bandwidth to longer wavelengths. The result of this is that the film becomes reflective to red and green light so that only blue light is transmitted. The characteristics are then permanently fixed in the blue transmissive regions by exposure to broad band UV radiation.

In order to form regions which are transmissive to the red part of the spectrum, the film 1 is heated slowly to 80 degrees centigrade and then exposed to. UV radiation for 30 seconds at a wavelength of 330 nanometres. The top layer adjacent the surface 2 is thus fixed so as to be reflective at about 450 nanometres. The film 1 is then heated for a further 30 minutes at 80 degrees centigrade so as to cause bandwidth expansion to longer wavelengths due to the diffusion effect mentioned hereinbefore. The filter characteristics are then permanently fixed by exposure to broadband UV radiation to provide a region which reflects both green and blue light.

In order to form green regions, the film 1 is slowly heated to about 105 degrees centigrade and then exposed to UV radiation of wavelength 320 nanometres for about 25 seconds. The top layer is thus fixed so as to be reflective at a wavelength of around 400 nanometres. The film is then maintained at the temperature of 105 degrees centigrade for a further 30 minutes to cause movement of the reflection band of the top layer to longer wavelengths because of diffusion. The underlying unfixed polymer continues to reflect blue light. Consequently, only green light is transmitted. Exposure to UV radiation of 330 nanometres for 18 seconds partially fixes the polymer to a greater depth which can be fine tuned by continued heating. The characteristics are then permanently fixed by exposure to broadband UV radiation. Typical UV exposure levels are approximately 0.3 mW/cm². The exposure wavelength may be determined by inserting an interference filter of bandwidth nominally equal to 10 nanometres between a UV source and the film. The exposure times are appropriate to a film which is substantially 20 microns thick and disposed between two glass substrates. However, actual exposure times may be adjusted for different thicknesses and material of the substrates.

Figure 3A:
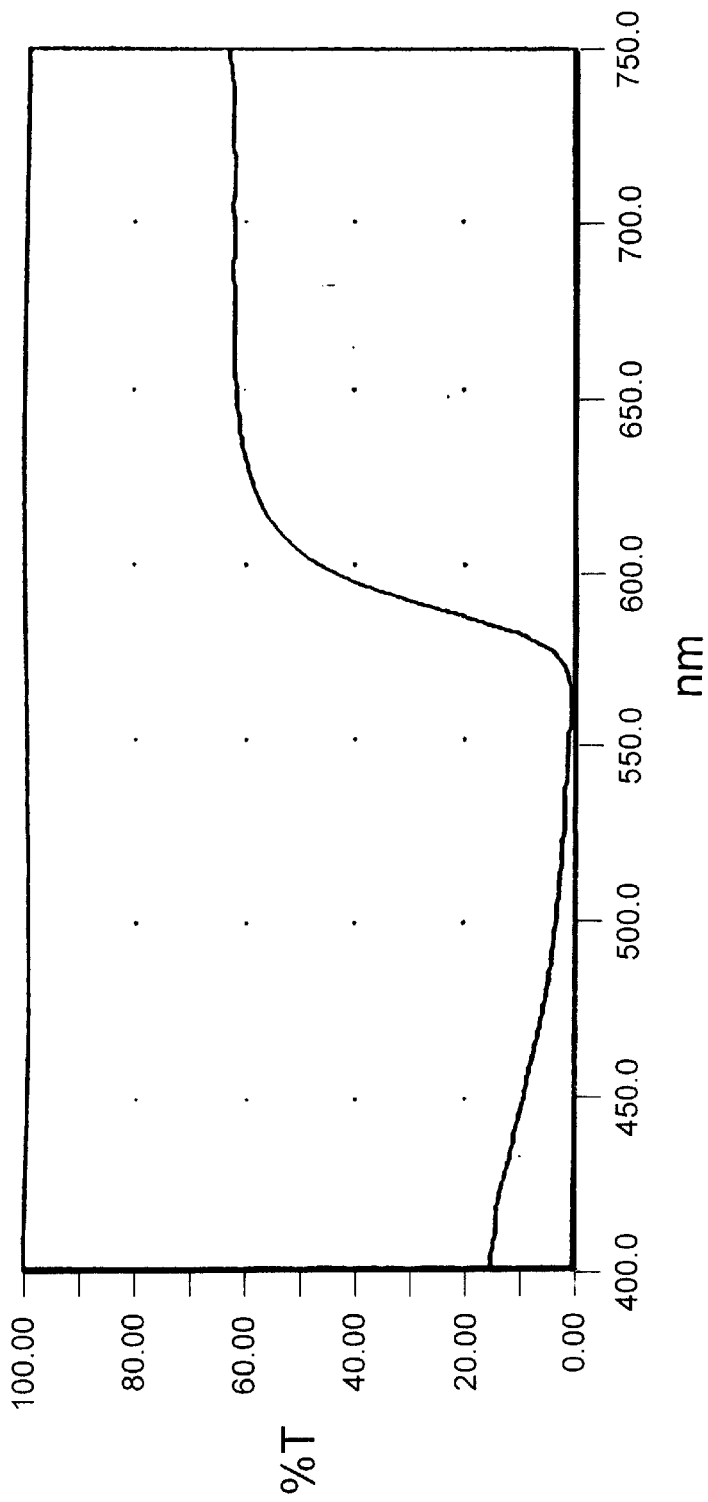
FIGS. 3a, 3b and 3c illustrate the transmission spectra as percentages against wavelength in nanometres for red, green and blue color filters, respectively, illuminated by circularly polarised light.
Figure 3B:
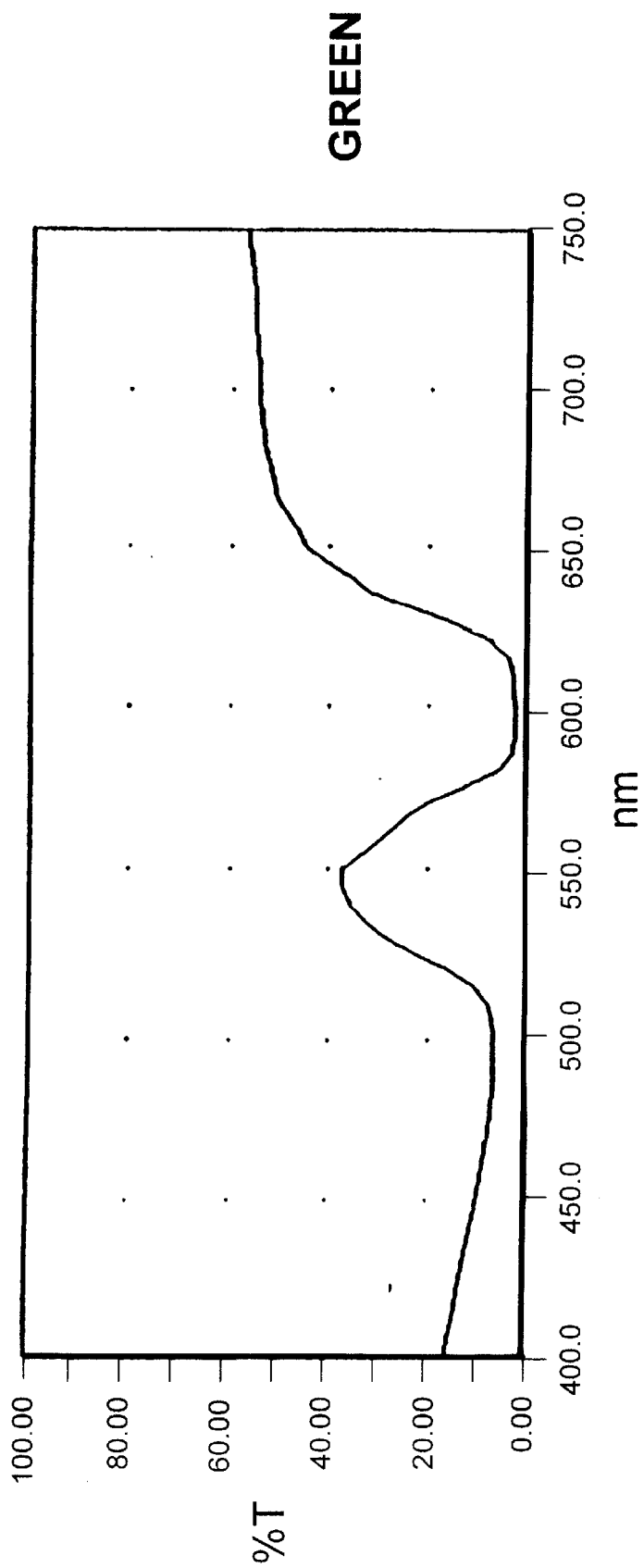
Figure 3C:
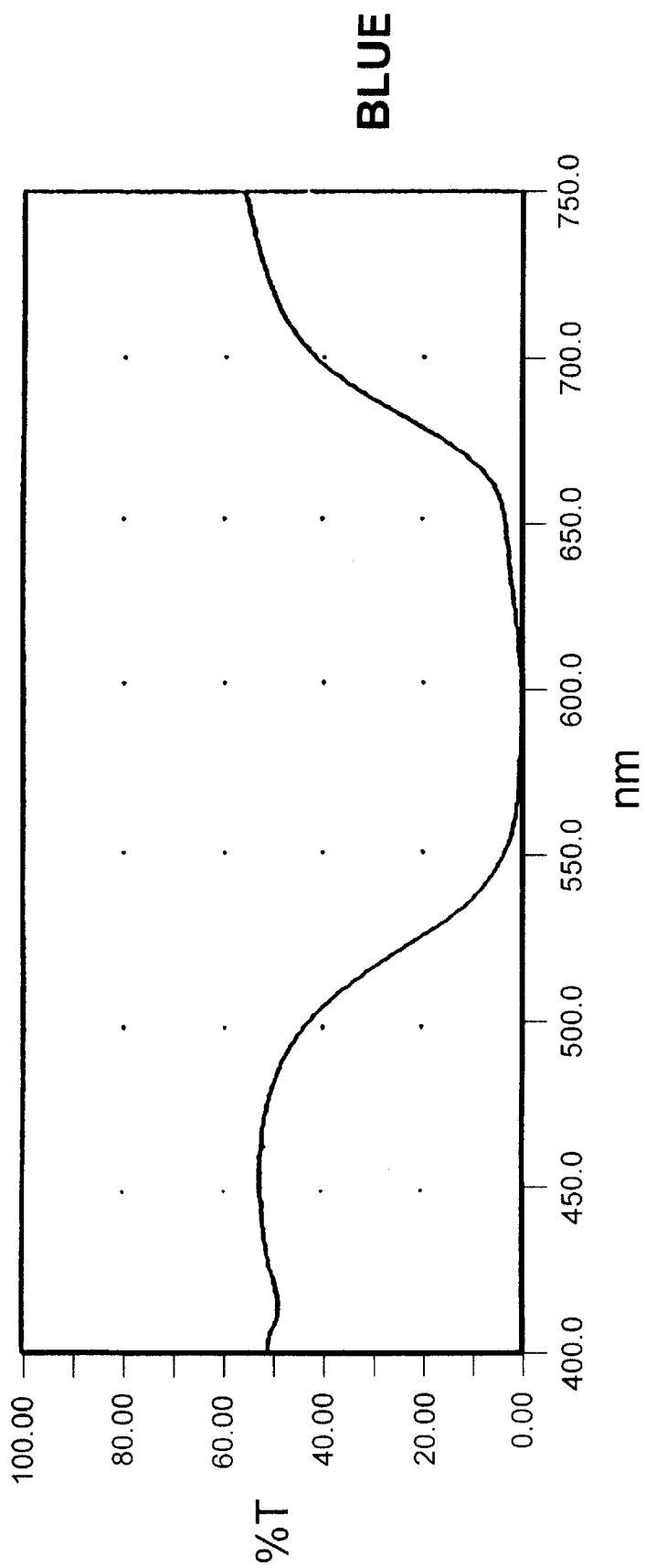

FIGS. 3a, 3b and 3c illustrate the optical transmission spectra for circularly polarised incident light on the red, green and blue regions made by the method described hereinbefore. Unpolarised light was passed through a linear polariser and quarterwave film to produce the circularly polarised light. In practice, most wavelengths can be considered to be converted to the desired circular polarisation state with a small component of the opposite handedness. Components of the wrong handedness pass through the filter and contaminate the transmission spectra. For instance, a typical quarterwave film does not perform so well in the blue spectral region and the effect of this can be seen in the spectra of FIGS. 3a, 3b and 3c.

Figure 4A:
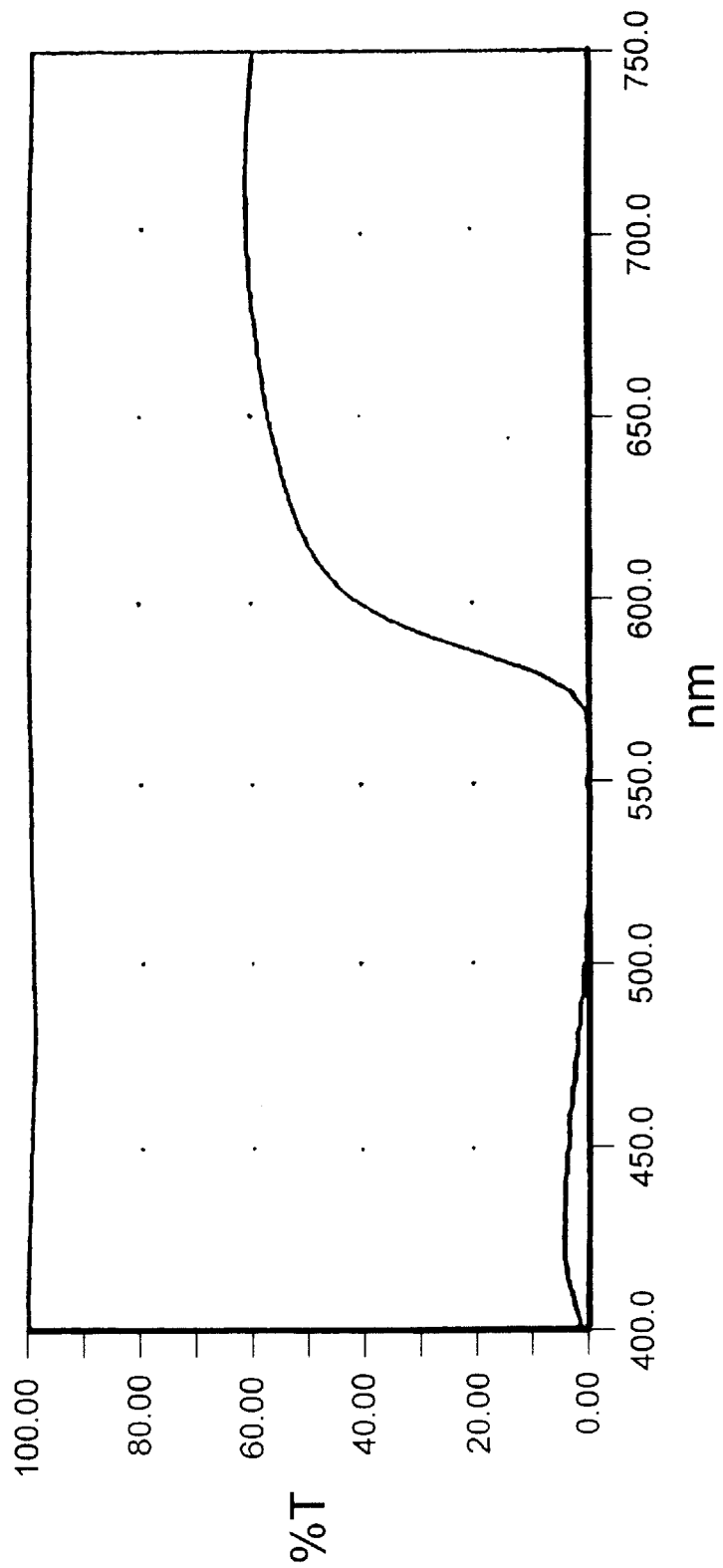
FIGS. 4a, 4b and 4c are similar to FIGS. 3a, 3b and 3c, respectively, but illustrate improvements in performance which may be achieved by using an output circular polariser.
Figure 4B:
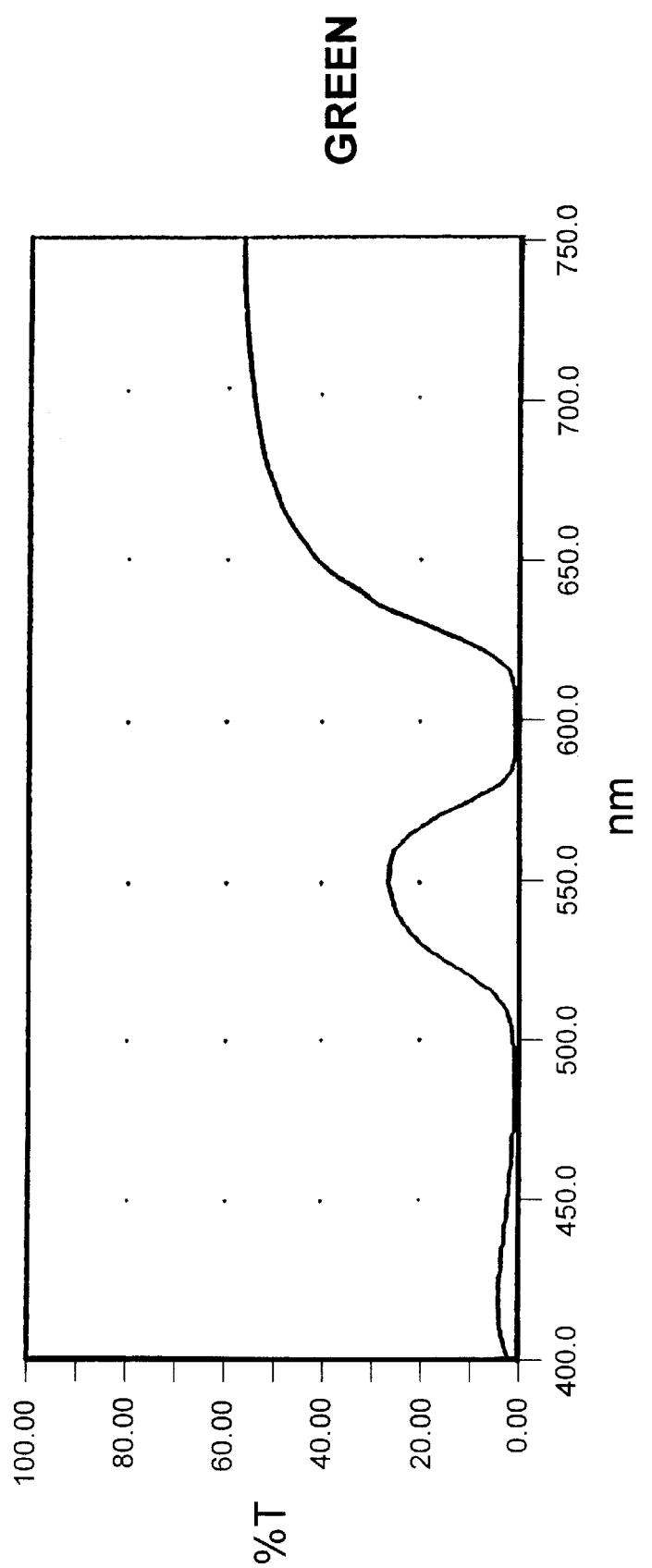
Figure 4C:
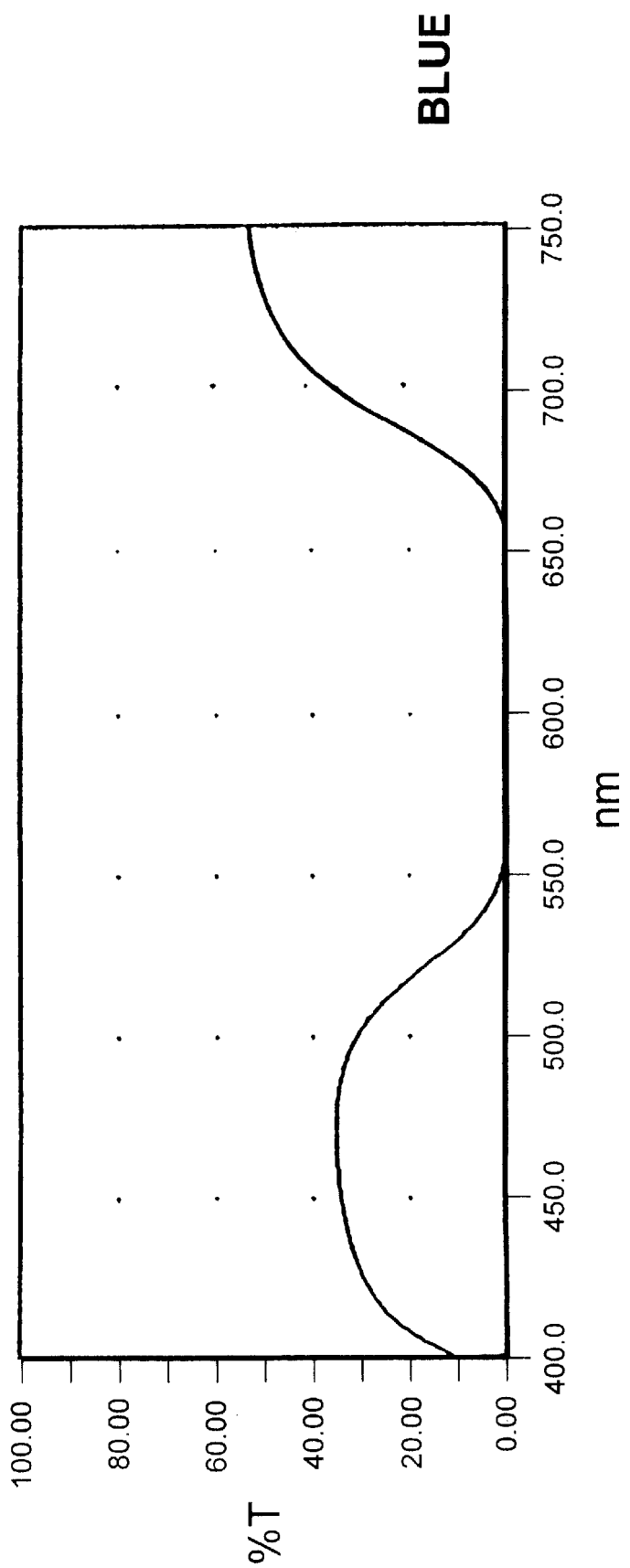

In order to improve the filter quality, output light from the whole filter may pass through an absorbing circular polariser. Light of the required handedness of polarisation and color is changed to linearly polarised light. Light of the undesired or wrong handedness of polarisation is converted to the orthogonal polarisation state and is absorbed. This results in substantially improved color saturation as shown in FIGS. 4a, 4b and 4c.

FIG. 5 illustrates the performance of such filters for light incident on-axis and at angles off-axis. The coordinates of FIG. 5 conform to the standard CIE 1931 coordinates and the target specifications for the color filters are indicated by unshaded squares. The dark triangles, squares, and diamonds illustrate performance for light incident at the angles in degrees adjacent the respective symbols. For light incident normally and over a useful range of angles of incidence, good performance is achieved. For higher angles of incidence, filter performance deteriorates. Off-axis performance can be improved by means of more complex structures which are described hereinafter and which may be made by the same method.

Figure 6:
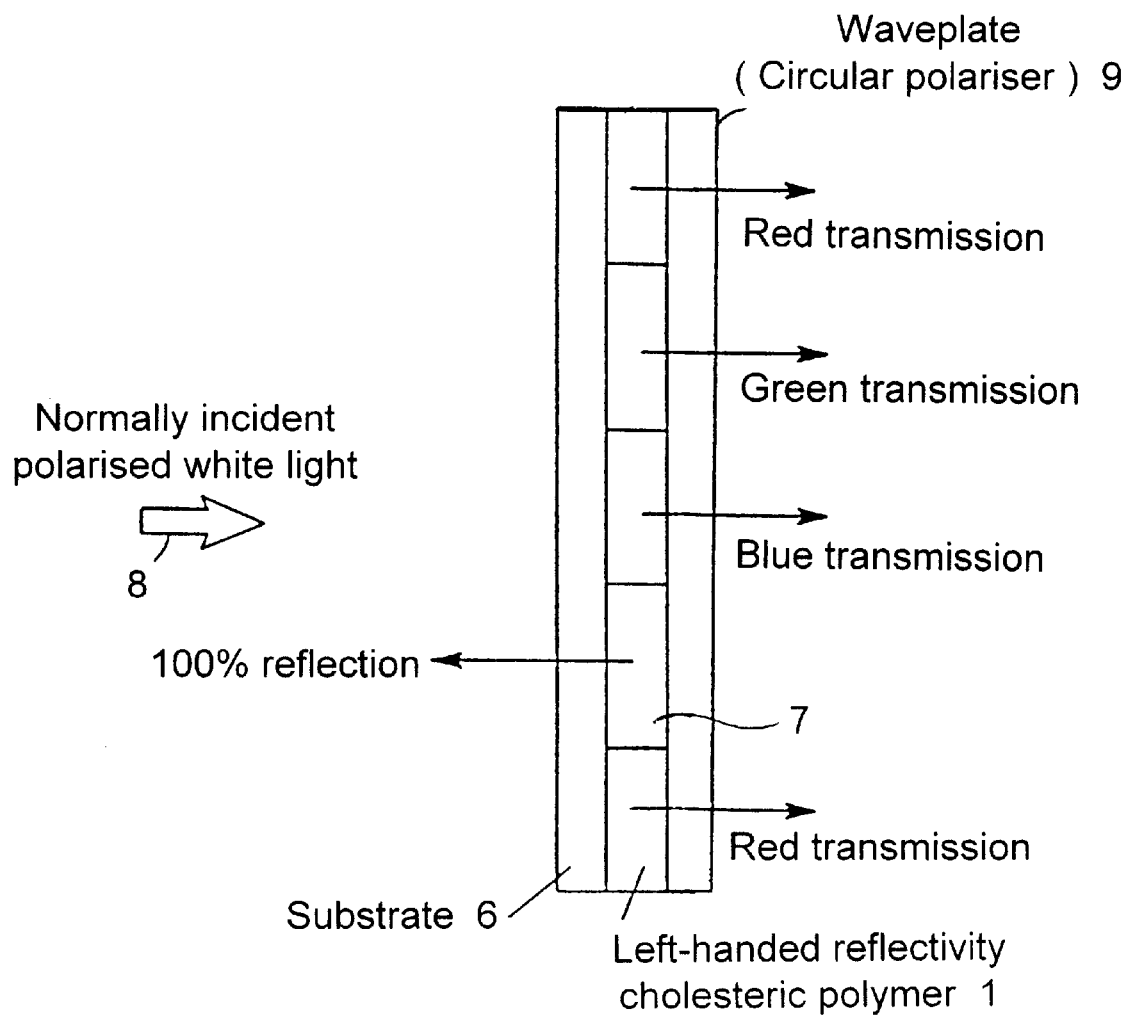
FIG. 6 illustrates a pixellated color filter with a black matrix constituting an embodiment of the invention.

FIG. 6 illustrates a typical filter formed in this way and comprising a left-handed reflectivity cholesteric polymer 1 formed on a substrate 6. In addition to regions which are transmissive to red, green and blue parts of the visible spectrum, a region 7 may be formed which is reflective to all visible wavelengths of a given handedness emitted by a source of the normally incident polarised white light 8. Thus, it is possible to provide a "black matrix" or "black mask" for improving the contrast of, for instance, displays using this filter. A waveplate 9, for example for converting circularly polarised light to linearly polarised light, can be provided at or in the output side of the filter. Alternatively, a waveplate could be provided at or in the input side of the filter.

FIGS. 7 to 10 illustrate transmissive color filters which are preferably made by the method described hereinbefore but could alternatively be made by other methods. These filters exhibit improved off-axis performance, for which some on-axis performance may be compromised, so as to provide filters having a wide range of applications.

Figure 7:
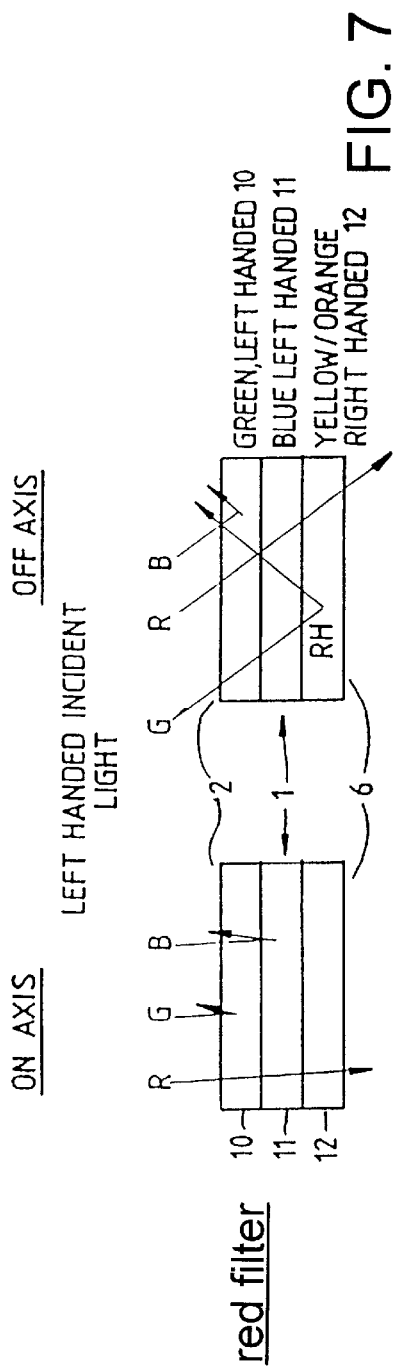
FIGS. 7, 8 and 9 are diagrammatic cross-sections illustrating red, green and blue filters, respectively constituting embodiments of the invention and their on-axis and off-axis performances.

FIG. 7 illustrates a red filter for filtering left handed circularly polarised incident light. The filter comprises a green left handed layer 10, a blue left handed layer 11 and a yellow/orange right handed layer 12. Each of the layers 10 to 12 comprises a cholesteric reflector which reflects light of the stated handedness and in the stated part of the spectrum when incident normally on the layer.

The left hand part of FIG. 7 illustrates the performance for polarised light which is incident substantially normally on the surface 2 of the film 1. The green part G of the visible spectrum is reflected by the layer 10 and the blue part B of the spectrum is reflected by the layer 11. The remainder of the visible spectrum, comprising the red part R, is transmitted by all three layers 10, 11 and 12.

The right hand part of FIG. 7 illustrates operation for light which is incident on the surface 2 at an acute angle to the normal. Each part of the visible spectrum is reflected by a layer which would reflect light of a longer wavelength when normally incident thereon. Thus, the blue part is reflected by the layer 10. The green part G passes through the layers 10 and 11 but has its direction of polarisation changed by the off-axis birefringence of these layers. Thus, when the green part G is incident on the layer 12, its polarisation has been substantially converted to left handed circular polarisation. The reflective band of the layer 12 is chosen such that the green part G of the spectrum is substantially reflected by the right handed yellow/orange normal reflection performance of the layer 12. Red light passes through the layers 10, 11 and 12 as desired.

Figure 8:
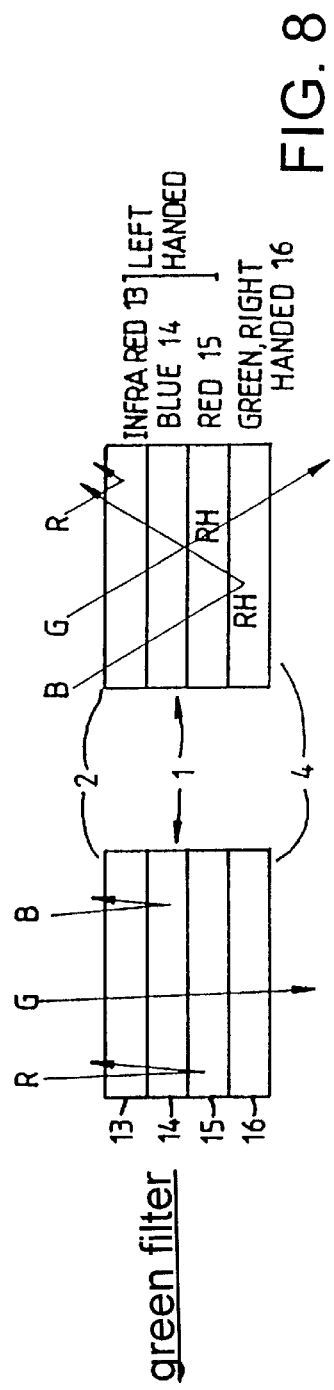

FIG. 8 illustrates a green transmission filter comprising left handed infrared, blue and red layers 13, 14 and 15, respectively, and a right handed green reflecting layer 16. The left hand part of FIG. 8 illustrates the operation for substantially normally incident light of left handed circular polarisation. The visible parts R, G and B all pass through the left handed infrared layer 13 but the blue part B is reflected by the layer 14. The red part R is reflected by the layer 15 whereas the green part G is transmitted through the film 1.

The right hand part of FIG. 8 illustrates operation for light which is incident at an angle to the normal to the surface 2. The red part R is reflected by the infrared reflecting layer 13. The birefringence of the layers 13, 14 and 15 to the blue part B is such that the blue part is converted from left handed to right handed circular polarisation and is thus reflected by the right handed green layer 16. The off-axis birefringence of the layers 13 and 14 changes the left handed green part G to right handed which is transmitted by the red layer 15.

Figure 9:
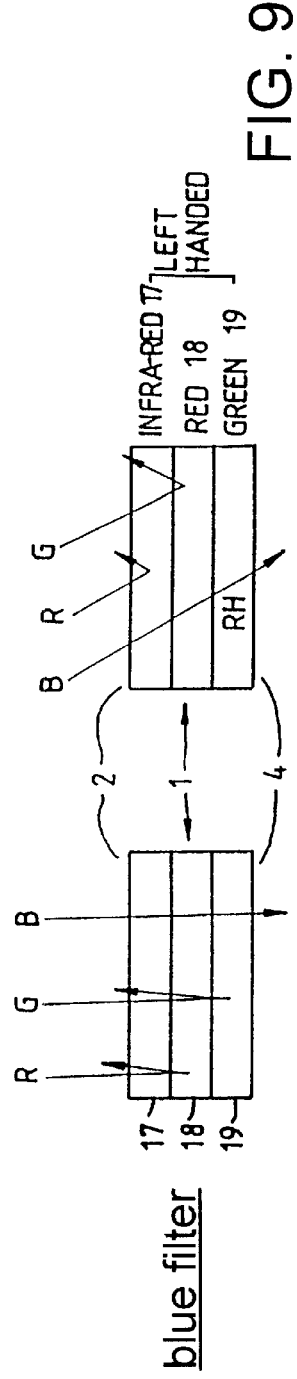

FIG. 9 illustrates operation of a blue transmission filter for left handed circularly polarised light incident on the surface 2. The filter comprises cholesteric layers 17, 18 and 19 for reflecting left handed circularly polarised infrared, red, and green parts, respectively of the spectrum.

The left part of FIG. 9 illustrates the performance for on-axis or normally incident light. The layer 18 reflects the red part R whereas the layer 19 reflects the green part G so that the blue part B is transmitted.

The right hand part of FIG. 9 illustrates the performance for off-axis light. The red part R is reflected by the layer 17 whereas the green part G is reflected by the layer 18. The total birefringence of the layers 17 and 18 to off-axis light is such that the polarisation of the blue part B is converted from left handed to right handed circular polarisation so that the blue part passes through the layer 19.

Figure 10:
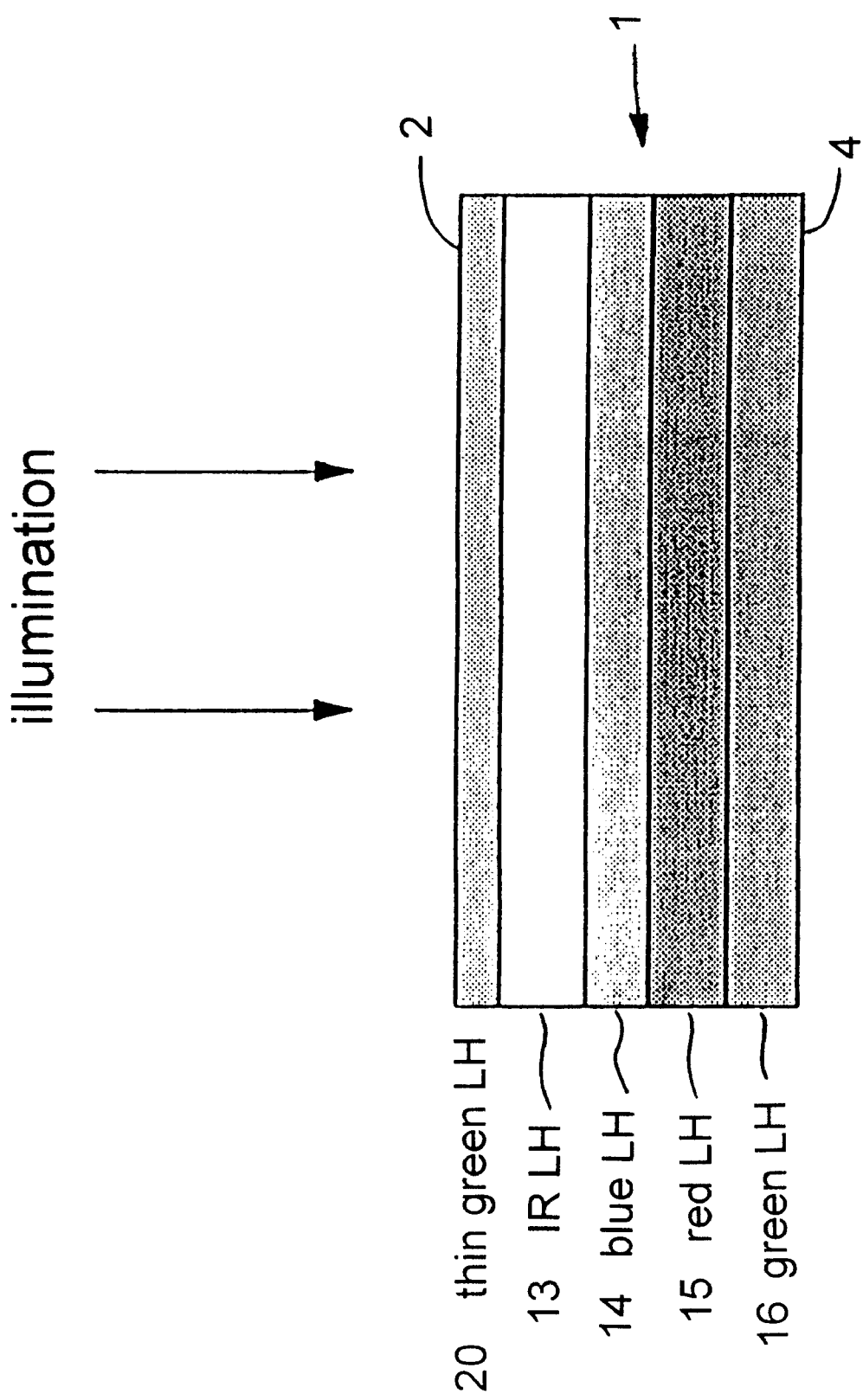
FIG. 10 is a cross-sectional diagrammatic view illustrating a modification of the green filter shown in FIG. 8.

The green transmission filter shown in FIG. 10 differs from that shown in FIG. 9 in that a thin left handed green-reflecting cholesteric layer 20 is provided adjacent the light-incident or input surface 2. The layer 20 reflects some of the on-axis green part G and also reflects at least some of the off-axis blue part, so that the green right handed layer 16 may be omitted. This arrangement sacrifices some on-axis performance to improve the off-axis performance and to provide a green transmission filter whose performance is less sensitive to angles of incidence on the surface 2 and of emergence from the surface 4.

A suitable compensation layer may be provided as the final layer adjacent the surface 4 of the film of all the filters shown in FIGS. 7 to 10. Such a compensation layer may be arranged to convert all of the transmitted component to the same polarisation state or to match the polarisation state, for instance, to an LCD.

Figure 11:
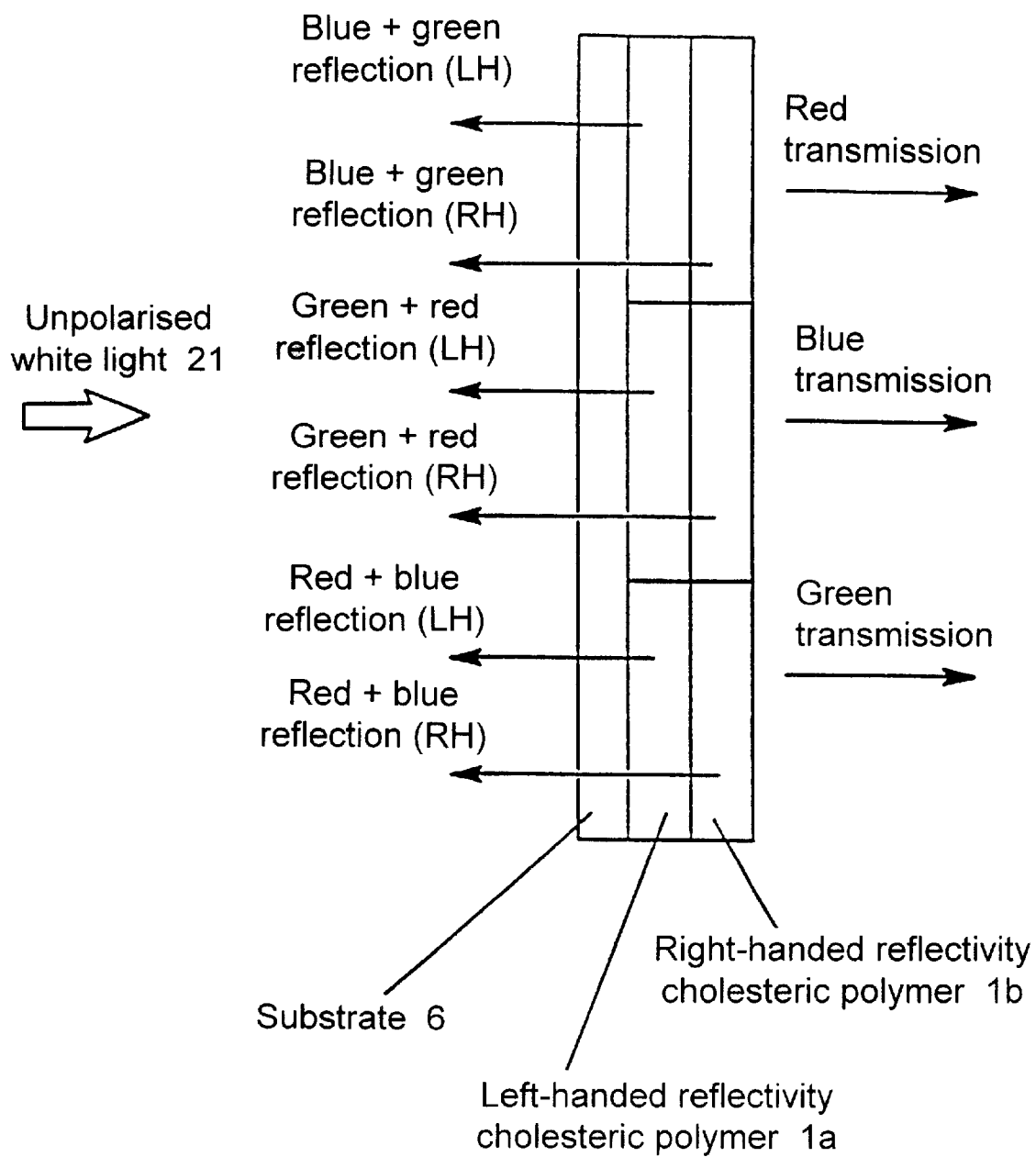
FIG. 11 is a diagrammatic cross-sectional view illustrating stacked filters for use with unpolarised light.

In order to provide color transmission filters which are suitable for filtering unpolarised white light 21, individual cholesteric films may be stacked together as illustrated in FIG. 11. In this case, the substrate 6 carries a cholesteric polymer film 1a for filtering the left handed circularly polarised component followed by a cholesteric polymer film 1b for filtering right handed circularly polarised light passed by the film 1a.

Figure 12:
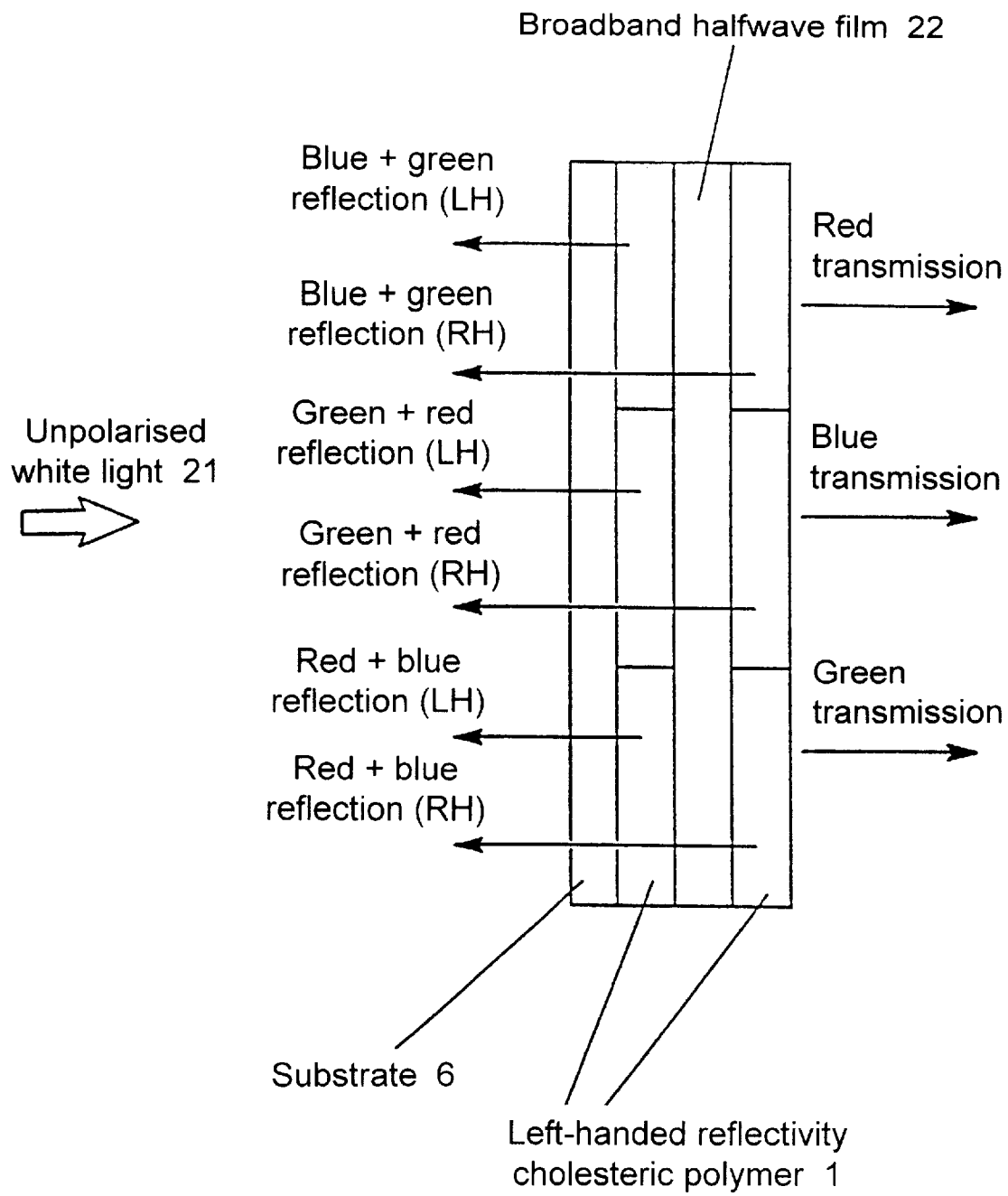
FIG. 12 is a diagrammatic cross-sectional view illustrating identical filters spaced by a broad band half waveplate for use with unpolarised light.

FIG. 12 illustrates an alternative arrangement for filtering unpolarised white light 21. In this case, the substrate 6 carries cholesteric polymer films 1 for filtering left handed circularly polarised light, the films being separated by a broad band half wave film 22 for converting light of one handedness of circular polarisation to the other handedness. The cholesteric polymer film 1 adjacent the substrate 6 passes right handed circularly polarised light to the film 22, where the polarisation is reversed to left handed circularly polarised. The films 1 thus both act on left handed circularly polarised light to transmit the red, green and blue parts of the spectrum as illustrated.

Figure 13:
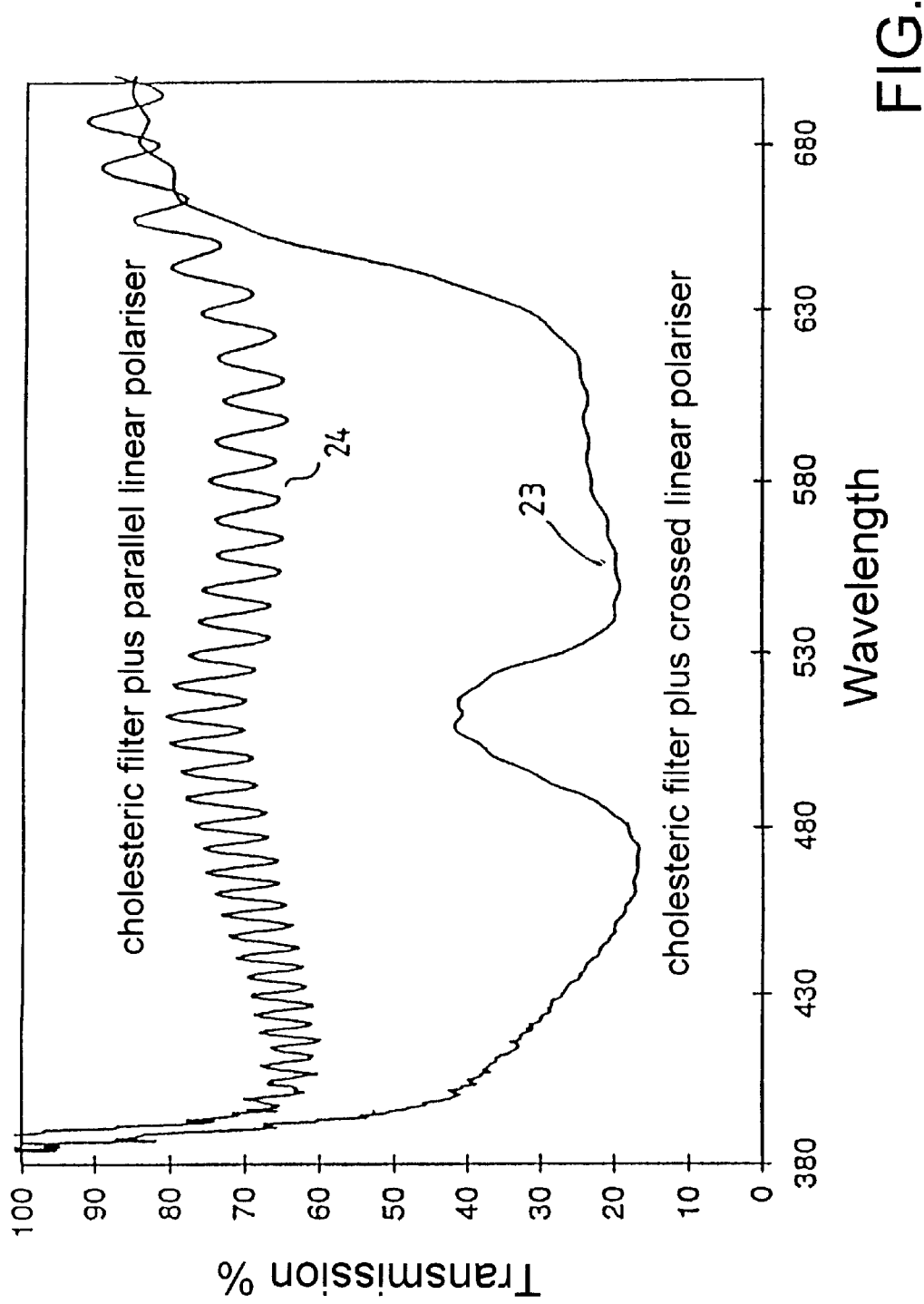
FIG. 13 is a graph of transmission in percent against wavelength in nanometres for a linear polarising green filter constituting an embodiment of the invention.
Figure 14A:
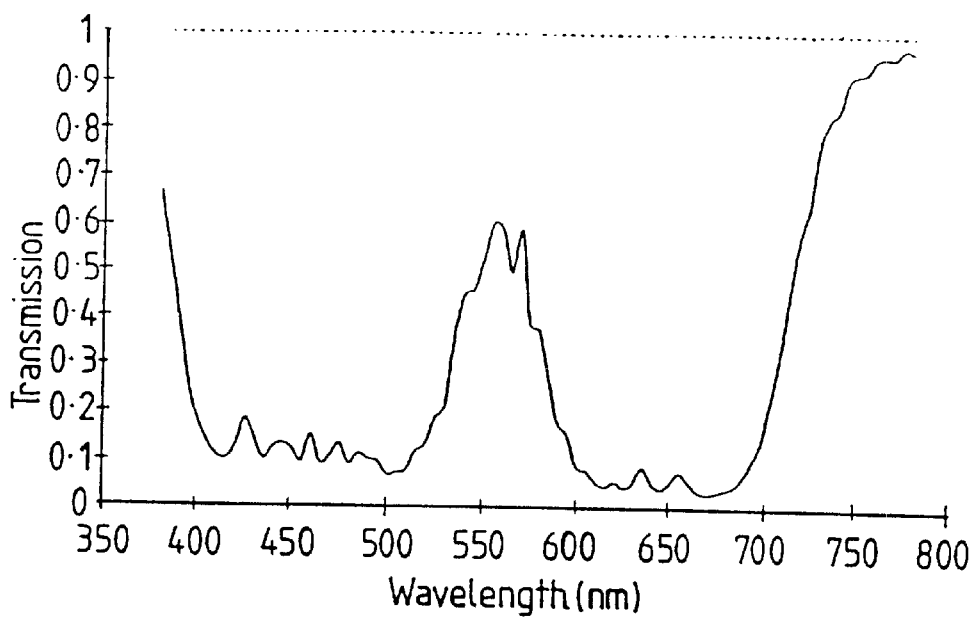
Figure 14B:
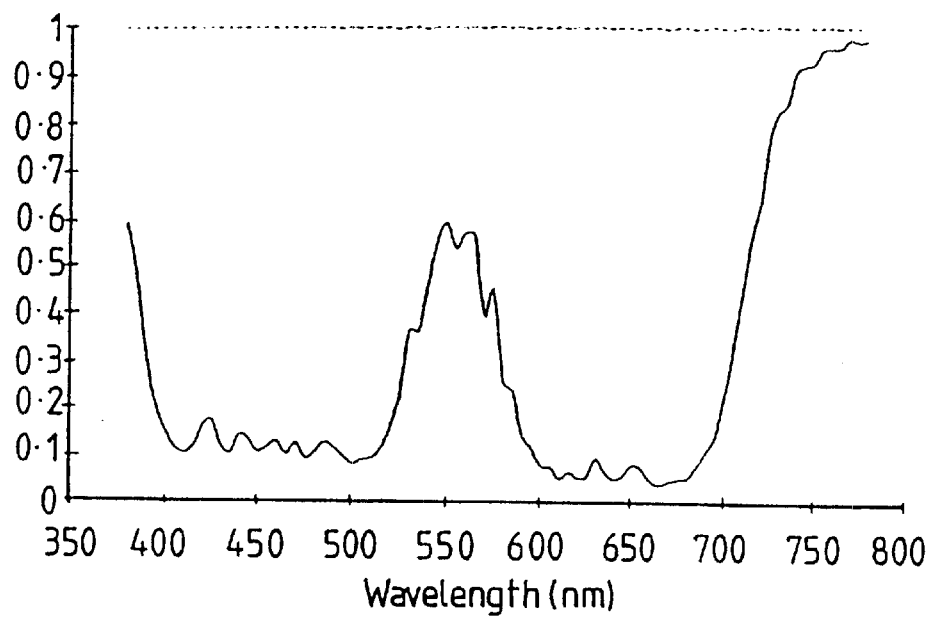
Figure 14C:
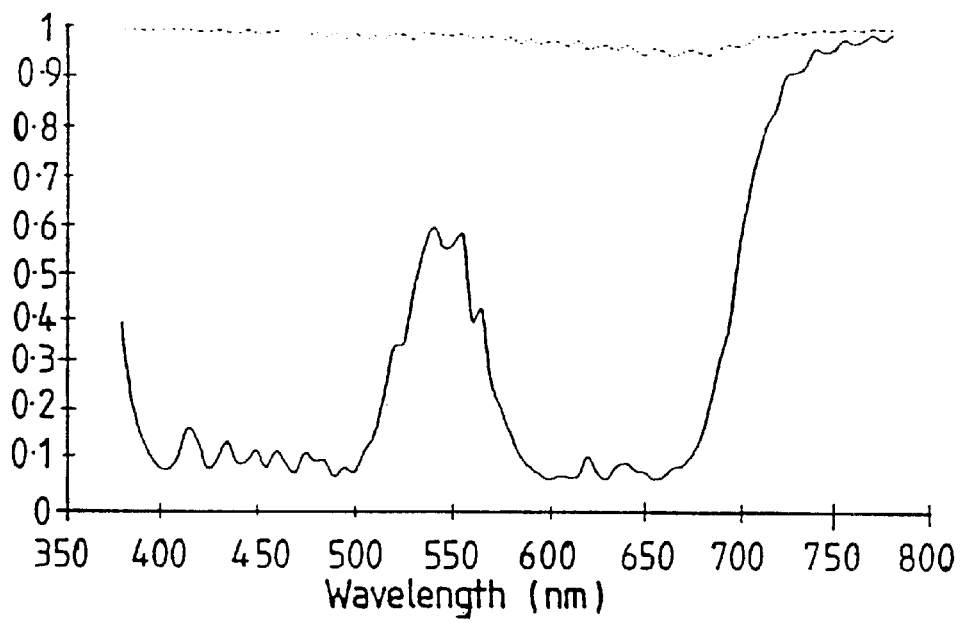
Figure 14D:
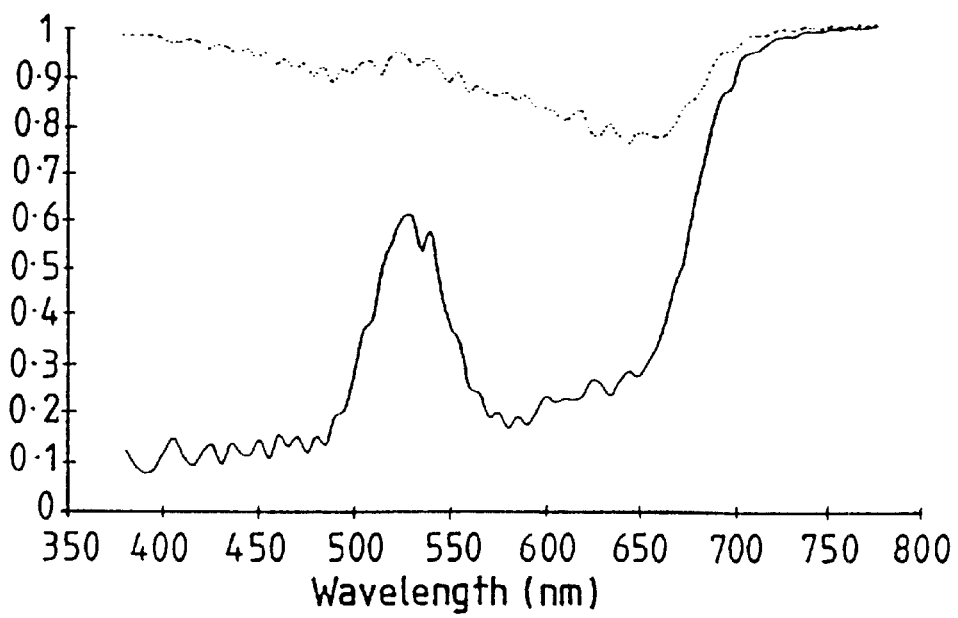

The method described hereinbefore may be used, for instance, to create waveplates in cholesteric films. For instance, it is possible to integrate a waveplate for converting circularly polarised light to linearly polarised light at the output surface 4 of the film. Such a waveplate may be combined with a color filter and FIG. 13 illustrates the performance of a combined green color filter and waveplate. The waveplate may be created by tilting the cholesteric liquid crystal polymer near the substrate, for instance by the use of surface effects or an electric field, after which the polymer is fixed using UV radiation.

The transmission illustrated in FIG. 13 is normalised relative to a single linear polariser. The linear polarising green filter is illuminated with unpolarised light. When viewed through a crossed output polariser, the filter acts as a green transmission filter as illustrated by the curve 23. When viewed through a parallel-oriented linear polariser, the filter has the appearance of a neutral transmitter.

FIGS. 14a to 14d illustrate the transmission spectra of a green transmitting filter constructed using a graded pitch distribution when modelled using 4×4 transfer matrix theory. The simulation is for different angles of incidence with the short-pitch surface being the input surface. For a left handed filter, the unbroken line gives the performance for left handed circularly polarised incident light whereas the broken line curve gives the performance for right handed circularly polarised input light.

As the angle of incidence increases, the pass band of the filter moves towards lower wavelengths.

FIG. 15 illustrates the emission spectrum for a typical fluorescent tube for use with an LCD. In the green part of the spectrum, the backlight has a relatively narrow emission peak.

The result of this is that, when viewed on-axis or for relatively small angles of incidence, the green filter whose performance is illustrated in FIG. 14a to 14d has a maximum transition value of approximately 60%. For off-axis viewing using a light source of the type whose performance is illustrated in FIG. 15, the transmission would vary with angle.

In order to overcome these disadvantages, it is possible using the method described hereinbefore to provide a green filter with several well-separated blocks or layers of different pitch so as to create a filter having a transmission spectrum as illustrated in FIGS. 16a to 16d. The light efficiency is substantially improved and the sensitivity to viewing angle is substantially reduced.

The cholesteric film whose performance is illustrated in FIGS. 16a to 16d comprises eight cholesteric layers with pitches of 253, 272, 291, 310, 320, 383, 400, and 420 nanometres with each layer being 15 pitches thick. The cholesteric refractive indices are 1.53 and 1.63 and a substrate and superstrate having refractive indices of 1.52 are assumed.

What is claimed is:

1. A filter for passing optical radiation of a first circular polarisation in a first waveband incident on an input surface, comprising:

a first layer which comprises a first cholesteric reflector for reflecting normally incident radiation of the first circular polarisation in a second waveband below the first waveband, a second layer which comprises a second cholesteric reflector for reflecting normally incident radiation transmitted by the first reflector of the first circular polarisation in a third waveband below the second waveband, and a third layer which comprises a third cholesteric reflector for reflecting normally incident radiation transmitted by the first and second reflectors of a second circular polarisation substantially orthogonal to the first circular polarisation in a fourth waveband at least partially between the first and second wavebands, wherein the first and second layers have a total birefringence for non-normally incident radiation in the second waveband such that non-normally incident radiation in the second waveband is at least partially converted from the first polarisation to the second polarisation such that both normally incident and non-normally incident radiation of the first circular polarisation in the first waveband are passed.

2. A filter as claimed in claim 1, in which the fourth waveband comprises a yellow-orange portion of the visible spectrum.

3. A filter for passing optical radiation of a first circular polarisation in a second waveband incident on an input surface, comprising:

a first layer which comprises a first cholesteric reflector for reflecting normally incident radiation of the first circular polarisation in a fifth waveband, a second layer which comprises a second cholesteric reflector for reflecting normally incident radiation transmitted by the first reflector of the first circular polarisation in a third waveband below the second waveband, a third layer which comprises a third cholesteric reflector for reflecting normally incident radiation transmitted by the first and second reflectors of the first circular polarisation in a first waveband between the fifth and second wavebands, and a fourth layer which comprises a fourth cholesteric reflector for reflecting normally incident radiation transmitted by the first, second and third reflectors of a second circular polarisation substantially orthogonal to the first circular polarisation in the second waveband, wherein the first and second layers have a total birefringence for non-normally incident radiation in the second waveband such that non-normally incident radiation in the second waveband is at least partially converted from the first circular polarisation to the second circular polarisation, and the first, second and third layers have a total birefringence for non-normally incident radiation in the third waveband such that non-normally incident radiation in the third waveband is at least partially converted from the first circular polarisation to the second circular polarisation such that both normally incident and non-normally incident radiation of the first circular polarisation in the second waveband are passed.

4. A filter for passing optical radiation of a first circular polarisation in a third waveband incident on an input surface, comprising:

a first layer which comprises a first cholesteric reflector for reflecting normally incident radiation of the first circular polarisation in a fifth waveband above the third waveband, a second layer which comprises a second cholesteric reflector for reflecting normally incident radiation transmitted by the first reflector of the first circular polarisation in a first waveband between the fifth and third wavebands, and a third layer which comprises a third cholesteric reflector for reflecting normally incident radiation transmitted by the first and second reflectors of the first circular polarisation in a second waveband between the first and third wavebands, wherein the first and second layers have a total birefringence for non-normally incident radiation in the third waveband such that the non-normally incident radiation in the third waveband is at least partially converted to a second circular polarisation substantially orthogonal to the first circular polarisation such that both normally incident and non-normally incident radiation of the first circular polarisation in the third waveband are passed.

5. A filter as claimed in claim 3, in which the fifth waveband is an infrared portion of the spectrum.

6. A filter as claimed in claim 4, in which the fifth waveband is an infrared portion of the spectrum.

7. A filter as claimed in claim 1, in which the first, second and third wavebands comprise red, green and blue portions, respectively, of the visible spectrum.

8. A filter as claimed in claim 3, in which the first, second and third wavebands comprise red, green and blue portions, respectively, of the visible spectrum.

9. A filter as claimed in claim 4, in which the first, second and third wavebands comprise red, green and blue portions, respectively, of the visible spectrum.

10. A filter as claimed in claim 1, made by a method of making a single film optical device, comprising the steps of:

(a) forming a layer of cholesteric liquid crystal polymerisable or cross-linkable material;

(b) establishing a first physical condition of the layer;

(c) initiating a first polymerisation or cross-linking by irradiation of at least a first region of the layer by radiation which penetrates the layer from a first surface thereof to a first depth which is less than a thickness of the layer;

(d) establishing a second physical condition of the layer which is different from the first physical condition; and (e) initiating a second polymerisation or cross-linking by irradiation of at least the first region by radiation which penetrates the whole thickness of the layer.

11. A filter as claimed in claim 3 made by a method of making a single film optical device, comprising the steps of:

(a) forming a layer of cholesteric liquid crystal polymerisable or cross-linkable material;

(b) establishing a first physical condition of the layer;

(c) initiating a first polymerisation or cross-linking by irradiation of at least a first region of the layer by radiation which penetrates the layer from a first surface thereof to a first depth which is less than a thickness of the layer;

(d) establishing a second physical condition of the layer which is different from the first physical condition; and (e) initiating a second polymerisation or cross-linking by irradiation of at least the first region by radiation which penetrates the whole thickness of the layer.

12. A filter as claimed in claim 4 made by a method of making a single film optical device, comprising the steps of:

(a) forming a layer of cholesteric liquid crystal polymerisable or cross-linkable material;

(b) establishing a first physical condition of the layer;

(c) initiating a first polymerisation or cross-linking by irradiation of at least a first region of the layer by radiation which penetrates the layer from a first surface thereof to a first depth which is less than a thickness of the layer;

(d) establishing a second physical condition of the layer which is different from the first physical condition; and (e) initiating a second polymerisation or cross-linking by irradiation of at least the first region by radiation which penetrates the whole thickness of the layer.

* * * * *